United States Patent
Frank et al.

(10) Patent No.: US 10,789,713 B2
(45) Date of Patent: Sep. 29, 2020

(54) SYMPLECTOMORPHIC IMAGE REGISTRATION

(71) Applicant: THE REGENTS OF THE UNIVERSITY OF CALIFORNIA, Oakland, CA (US)

(72) Inventors: Lawrence R. Frank, San Diego, CA (US); Vitaly L. Galinsky, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 173 days.

(21) Appl. No.: 16/071,418

(22) PCT Filed: Jan. 26, 2017

(86) PCT No.: PCT/US2017/015173
§ 371 (c)(1),
(2) Date: Jul. 19, 2018

(87) PCT Pub. No.: WO2017/132403
PCT Pub. Date: Aug. 3, 2017

(65) Prior Publication Data
US 2020/0202531 A1    Jun. 25, 2020

Related U.S. Application Data

(60) Provisional application No. 62/287,362, filed on Jan. 26, 2016.

(51) Int. Cl.
*G06T 7/00* (2017.01)
*G06T 7/37* (2017.01)
*G06T 11/00* (2006.01)

(52) U.S. Cl.
CPC ............ *G06T 7/0016* (2013.01); *G06T 7/37* (2017.01); *G06T 11/008* (2013.01); *G06T 2207/10088* (2013.01); *G06T 2207/30016* (2013.01)

(58) Field of Classification Search
None
See application file for complete search history.

(56) References Cited

U.S. PATENT DOCUMENTS 6,611,615 B1    8/2003    Christensen
6,992,484 B2    1/2006    Frank
(Continued)

FOREIGN PATENT DOCUMENTS

WO    2014144331 A1    9/2014
WO    2016176684 A1    11/2016

OTHER PUBLICATIONS

Multidimensional quantum normal forms, Moyal star product, and torus quantization Matthew Cargo, Jul. 14, 2005.*
(Continued)

*Primary Examiner* — Nancy Bitar
(74) *Attorney, Agent, or Firm* — Elanor Musick; Musick Davison LLP

(57) ABSTRACT

A method and system for registration of a multi-dimensional image include defining an input image and a reference image in the same fixed Cartesian grid, then mapping locations within the reference image and the input image to phase space using a Hamiltonian function to define a symplectomorphic map, where the map is embedded in an energy shell. The mapping step is iterated until a sequence of energy shells is created. The energy shells are used generate curvilinear mapping grid which is then applied to the first image to generate a registered output image data. The data may be
(Continued)

preconditioned to account for nearest neighbor coupling and/or to equalize the dimensionality of the images.

16 Claims, 17 Drawing Sheets
(15 of 17 Drawing Sheet(s) Filed in Color)

(56) References Cited

U.S. PATENT DOCUMENTS

| | | | |
|---|---|---|---|
| 7,106,891 | B2 | 9/2006 | Wyman et al. |
| 7,639,896 | B2 | 12/2009 | Sun et al. |
| 7,672,790 | B2 | 3/2010 | McGraw et al. |
| 7,773,074 | B2 | 8/2010 | Arenson et al. |
| 8,742,754 | B2 | 6/2014 | Hasan |
| 9,204,835 | B2 | 12/2015 | Parsey et al. |
| 9,404,986 | B2 | 8/2016 | White et al. |
| 9,645,212 | B2 | 5/2017 | Frank et al. |
| 10,297,022 | B2 * | 5/2019 | Frank ............... G06T 11/003 |
| 2005/0054910 | A1 | 3/2005 | Tremblay et al. |
| 2005/0119834 | A1 | 6/2005 | Kita et al. |
| 2005/0154701 | A1 | 7/2005 | Parunak et al. |
| 2005/0213809 | A1 | 9/2005 | Lees et al. |
| 2006/0259282 | A1 | 11/2006 | Failla et al. |
| 2007/0036402 | A1 | 2/2007 | Cahill et al. |
| 2007/0049817 | A1 | 3/2007 | Preiss et al. |
| 2007/0087756 | A1 | 4/2007 | Hoffberg |
| 2008/0091388 | A1 | 4/2008 | Failla et al. |
| 2008/0287796 | A1 | 11/2008 | Kiraly et al. |
| 2009/0010540 | A1 | 1/2009 | Mullick et al. |
| 2009/0080604 | A1 * | 3/2009 | Shores ............... A61B 6/032 378/37 |
| 2009/0161933 | A1 * | 6/2009 | Chen ............... G06T 11/006 382/131 |
| 2010/0172567 | A1 * | 7/2010 | Prokoski ............... A61B 5/0064 382/132 |
| 2011/0201935 | A1 | 8/2011 | Collet-Billon et al. |
| 2011/0255763 | A1 | 10/2011 | Bogoni et al. |
| 2011/0297369 | A1 | 12/2011 | Kumaran et al. |
| 2013/0259340 | A1 | 10/2013 | Tseng et al. |
| 2013/0342206 | A1 | 12/2013 | Ugurbil |
| 2014/0153797 | A1 | 6/2014 | Wan et al. |
| 2014/0192046 | A1 * | 7/2014 | Paragios ............... G06T 15/005 345/419 |
| 2016/0110911 | A1 | 4/2016 | Frank et al. |
| 2016/0180526 | A1 | 6/2016 | Satoh et al. |
| 2016/0210742 | A1 | 7/2016 | Weiss et al. |
| 2016/0225146 | A1 | 8/2016 | Frank et al. |
| 2016/0343127 | A1 | 11/2016 | Miller et al. |
| 2016/0343129 | A1 | 11/2016 | Novikov et al. |
| 2017/0103533 | A1 | 4/2017 | Brokman et al. |
| 2017/0337824 | A1 * | 11/2017 | Chen ............... G08G 5/0086 |

OTHER PUBLICATIONS

Simultaneous Multi-Scale Diffusion Estimation and Tractography Guided by Entropy Spectrum Pathways Vitaly L. Galinsky and Lawrence R. Frank; May 2015 (Year: 2015).*
Pattern formation in hamiltonian systems with continuous spectra a normal form single wave model; Balmforth et al Mar. 2013 (Year: 2013).*
Ashburner, John; "A fast diffeomorphic image registration algorithm", NeuroImage, 2007, vol. 38, pp. 95-113.
Assemial et al., "Recent advances in diffusion MRI modeling: Angular and radial reconstruction", Elsevier, Medical Image Analysis, 15 (2011) 369-396.
Balmforth, N.J. et al. "Pattern formation in Hailtonian systes with continuous spectra; a normal-form single-wave model." In: arXiv preprint arXiv:1303.0065. Mar. 1, 2013 from https://arxiv.org/pdf/1303.0065.pdf downloaded on Aug. 10, 2016.
Behrens, T.E.J. et al., "Probabilistic diffusion tractography with multiple fibre orientations: What can we gain?"; NeuroImage vol. 34 (2007) pp. 144-155.
Bista, Sujal et al., "Visualization of Brain Microstructure through Spherical Harmonics Illumination of High Fidelity Spatio-Angular Fields"; IEEE Trans Vis Comput Graph, Dec. 2014; 20(12):2416-2525.
Burda, Z. et al., "The various facets of random walk entropy", presented at the 22nd Marian Smoluchowski Symposium on Statistical Physics, Zakopane, Poland, Sep. 12-17, 2009, 40 pages.
Campbell, Jennifer S.W. et al., "Diffusion Imaging of White Matter Fibre Tracts", Thesis submitted to McGill University, Nov. 8, 2004, Montreal, Canada, copyright Jennifer Campbell, 2004, 183 pages.
Cargo, Matthew et al., "Multidimensional quantum normal forms, Moyal star product, and torus quantization," In arXiv:math-ph/0507032v1, Jul. 14, 2005 [online] [retrieved on Mar. 16, 2017].
Chang, Ping et al., "Predictability of Linear Coupled Systems. Part I: Theoretical Analyses" Journal of Climate, Apr. 2004, p. 1474-1486.
Chung, Moo K. et al., "Encoding cortical surface by spherical harmonics", Statistica Sinica vol. 18 (2008), 1269-1291.
Descoteaux, Maxime et al., "Deterministic and probabilistic Q-Ball tractctography: from diffusion to sharp fiber distributions", No. 6273, Aug. 2007, Theme BIO, 36 pages.
Enrvik, Aron, "3D visualization of weather radar data", Thesis project in computer graphics at Linkoping University, Linkoping, Jan. 2002, LITH-ISY-EX-3252-2002, 92 pgs.
Frank, Lawrence R. et al., "Information pathways in a discorded lattice", Physical Review, E89, 032142 (2014), 11 pgs.
Galinsky, Vitaly L. et al. "Simultaneous Multi-Scale Diffusion Estimation and Tractography Guided by Entropy Spectrum Pathways", IEEE transactions on medical imaging, Dec. 18, 2014.
Galinsky, Vitaly L. et al., "Automated segmentation and shape characterization of volumetric data", NeuroImage vol. 92 (2014) pp. 156-168.
Goncalves, Vitor, "Interaction and visualization techniques for volumetric data of various scalar modalities: integration of visualization and interaction", Electronica E Telecomunicacoes, vol. 5, No. 3, Jun. 2011, pp. 344-351.
Huang, Heng et al., "Functional analysis of cardiac MR images using SPHARM modeling", Proc. SPIE 5747, Medical Imaging 2005: Image Processing, May 5, 2005, 1384.
Le Bihan, Denis, "Diffusion, confusion and functional MRI", NeuroImage, 2011, NeuroImage.2011.09.058, 6 pages.
Lu, Meng et al. "Snake-based brain white matter fiber reconstruction", Bio-Medical Materials and Engineering vol. 24 (2014) pp. 2945-2953.
Miller, Michael I. et al., "Collaborative Computational Anatomy: An MRI Morphometry Study of the Human Brain Via Diffeomorphic Metric Mapping", Human Brain Mapping, 2009, vol. 30., pp. 2132-2141.
Mukherjee, P. et al., "Diffusion tensor MR imaging and fiber tractography: technical considerations", AJNR Am J. Neuroradiol vol. 29, May 2009, pp. 843-852.
Mukherjee, P. et al., "Diffusion tensor MR imaging and fiber tractography: theoretic underpinnings", AJNR Am J. Neuroradiol vol. 29, Apr. 2008, pp. 632-641.
PCT/US2014/055712, International Search Report / Written Opinion dated Dec. 8, 2014, 15 pages.
PCT/US2016/030446, International Search Report and Written Opinion, dated Aug. 8, 2016, 15 pages.
PCT/US2017/015173 International Search Report and Written Opinion dated Apr. 12, 2017, 9 pages.
Peters, J.F. et al., "Classification of meteorological volumetric radar data using rough set methods, Pattern Recognition Letters", vol. 24 (2003) pp. 911-920.
Scholkopf, Bernhard et al. "Nonlinear Component Analysis as a Kernel Eigenvalue Problem", Neural computation, Jul. 1, 1998, retrieved from , downloaded on Aug. 10, 2016.
Senjem, Matthew L., et al., "Comparison of different methodological implementations of Voxel-based morphometry in neurodegenerative disease", Neuroimage vol. 26(2), Jun. 2005, pp. 600-608.
Setsompop, K et al., (2013), Pushing the limits of in vivo diffusion MRI for the Human Connectome Project; NeuroImage, vol. 80, Oct. 15, 2013; pp. 220-233.

(56) References Cited

OTHER PUBLICATIONS

Shaw, Christopher D. et al., "Real-time weather data on terrain", Proc. SPIE 4368, Visualization of Temporal and Spatial Data for Civilian and Defense Applications, Aug. 23, 2001, 8 pages.

Sinatra, Roberta et al., "Maximal-entropy random walks in complex networks with limited information", Physical Review vol. 83, 030103(R), 2011, 4 pages.

Styner, Martin, "Statistical shape analysis of brain structures using SPHARM-PDM", Insight Journal, MICCAI 2006 Opensource Workshop, 7 pages.

Tournier, Jacques-Donald et al., "Diffusion tensor imaging and beyond", Magn Reson Med. vol. 65(6), Jun. 2011, pp. 1532-1556.

\* cited by examiner

SYMPLECTOMORPHIC IMAGE REGISTRATION

RELATED APPLICATIONS

This application is a 371 national stage filing of International Application No. PCT/US2017/015173, filed Jan. 26, 2017, which claims the benefit of the priority of U.S. Provisional Application No. 62/287,362, filed Jan. 26, 2016, each of which is incorporated herein by reference in its entirety.

GOVERNMENT RIGHTS

This invention was made with government support under Grant No. MH096100 awarded by the National Institutes of Health and Grant No. DBI-1147260 awarded by the National Science Foundation. The government has certain rights in the invention.

FIELD OF THE INVENTION

The invention relates to a method for multidimensional image registration based on the Hamiltonian formalism.

BACKGROUND

Modern imaging systems are increasingly capable of acquiring data sensitive to a wide range of physical parameters at multiple resolutions, thus offering greater sensitivity to structural and dynamical information in complex biological systems. However, these technological advancements present the increasingly important theoretical and computational challenge of how to rigorously and efficiently combine, or "register", such data in order to be able to accurately detect and quantify subtle and complex system characteristics.

An important example of this problem, is presented by the application of magnetic resonance imaging (MRI) methods to human neuroimaging (neuro-MRI). MRI is an exceedingly flexible technology for measuring various characteristics of water in biological systems and three major techniques have emerged as the cornerstone of neuro-MRI: high resolution anatomical acquisitions (HRA), which facilitates the characterization of brain morphology, diffusion weighted MRI (DW-MRI), which allows the characterization of focal alterations in tissue diffusion as well as the reconstruction of neural fiber pathways critical to brain function, and functional MRI (FMRI), which is capable of detecting spatial-temporal variations in brain activity, even if the subject is "at rest" and not performing a task in the magnet (called resting state fMRI, or rsFMRI). Each of these modalities is typically acquired at different spatial resolution and possess unique contrast characteristics.

HRA is typically a single high spatial resolution volume of data sensitive to signal relaxation induced contrast between different tissue types (e.g., gray and white matter). DW-MRI data consists of multiple volumes of moderate resolution data with a range of sensitivities to the magnitudes and direction of length-scale field dependent signal variations modulated by restricted diffusion of water with complex tissue geometries, and FMRI data consists of multiple low resolution volumes collected at different time points with sensitivity to the spatial-temporal intrinsic contrast induced by magnetization changes created by the deoxygenation of hemoglobin, filtered through the dynamic metabolic physiological changes (e.g., blood flow) during brain activity. However, the overarching goal of neuro-MRI is to derive quantitative quantitative estimates of the brain morphology, and structural (fiber) and functional (activation) connectivity by combining these data into a coherent characterization of brain structure and function.

The ability to register image data to a common coordinate system is important not only for combining different modalities, but is also for combining data across subjects. Spatial normalization involves warping multiple images to a single reference frame, thus allowing researcuers and clinicians to analyze intra-subject and inter-subject anatomical variations on a similar basis. It is, thus, a critical feature of virtually all imaging studies that require quantitative statistical analysis of group populations. Consequently, this subject has been the focus of much research. This subject has also been a focus in computational neuroanatomy, which has motivated the development of "diffeomorphic" registration methods for which faster and more efficient algorithms continue to be developed, as well as various regularizations and addition enhancements such as local-global mixture, contrast changes, multichannel mapping, etc, and the use of probabilistic diffeomorphic registration methods. These registration advancements are important to group analyses and the development of standard atlases, which serve a critical role in the standardization of studies. The emergence of diffusion tensor imaging (DTI) methods and their variants for connectivity studies required the extension of diffeomorphic registration methods to accommodate tensor data. DTI is an imaging technique that provides quantitative information with which to visualize and study connectivity and continuity of neural pathways in the central and peripheral nervous systems in vivo. These methods have had a profound effect on the success of numerous scientific studies on important clinical issues such as Alzheimer's and traumatic brain injury, as well as studies in other organs (cardiac, lungs, etc.)

The appeal of diffeomorphic mapping to the problem of image registration is that it provides a non-linear transformation by which each spatial coordinate is uniquely, and therefore unambiguously, mapped to another. Moreover, an inverse map exists that facilitates the important practical ability to map either to or from different image volumes. However, while efforts are ongoing to develop faster methods, diffeomorphic algorithms that are currently used in image registration still tend to be computationally intensive.

SUMMARY

In an exemplary embodiment, the inventive method builds a diffeomorphic mapping as a sequence of symplectomorphic maps with each map embedded in a separate energy shell. The approach adds a novel phase space regularization based on a powerful entropy spectrum pathways framework. The framework provides a unique opportunity to tailor image details into regularization scheme by choosing an image derived regularization kernel. Spherical wave decomposition (SWD) is applied as a powerful preconditioning tool in a position domain, allowing accurate and fast interpolation, resampling and estimation of fixed shape rotation and scale. The result is an efficient and versatile method capable of fast and accurate registration of a variety of volumetric images of different modalities and resolutions.

The inventive approach is demonstrated on the three different magnetic resonance imaging (MRI) modalities routinely used for human neuroimaging applications by mapping between high resolution anatomical volumes, medium resolution diffusion weighted MRI (DW-MRI) volumes and anatomicals, and low resolution functional MRI (fMRI) images and anatomicals. The typical processing time for high quality mapping ranges from less than a minute to several minutes on a modern multi core CPU for a typical high resolution anatomical (~$256^3$ voxels) MRI volumes.

In one aspect of the invention, a method is disclosed that is similar in spirit to diffeomorphic mapping, but is more general and flexible. The transformation is developed within a Hamiltonian formalism in which not only the spatial coordinates are considered, but the entirety of phase space. Thus, the volume preserving nature of diffeomorphisms to spatial coordinates is elevated to volume preservation of phase space, which is a called a "symplectomorphism." This theoretical construct enables a novel flexible, accurate, and robust computational method based on a sequence of energy shell transformations. The generality of the Hamiltonian framework facilitates the inclusion of powerful prior information for regularization in phase space using the entropy spectrum pathways (ESP) method, which is disclosed in pending U.S. application Ser. No. 14/919,605, filed Oct. 21, 2015, incorporated herein by reference. The method also incorporates fast, accurate, and flexible spatial preconditioning using spherical wave decomposition (SWD), which is disclosed in International Patent Publication No. WO 2015/039054, also incorporated herein by reference.

In one example, neuro-MRI three different image acquisitions are typically acquired on a single subject: high resolution anatomical data (HRA) sensitive to tissue contrast, moderate resolution diffusion tensor imaging (DTI) sensitive to tissue microstructure and to large scale neural connectivity, and low resolution functional MRI (FMRI) sensitive to spatial-temporal fluctuations in brain activity. The goal is to integrate the results from these different modalities in order to both assess an individual's brain structure and function and to compare it to other subjects. For each of these three data types we have developed a novel processing methodology. For analysis of HRA, we developed the spherical wave decompositions (SWD), e.g., WO2015/039054. For DTI we developed the GO-ESP algorithm, described in U.S. patent application Ser. No. 14/919,605, which is based on the method of entropy spectrum pathways (ESP). For FMRI we developed the entropy field decomposition (EFD) method. The inventive method, referred to as "SymReg-ESP", takes data pre-processed with these methods and integrates an individual's HRA, DTI, and FMRI data into a common coordinate system with the same spatial resolution. SymReg-ESP is used to build a diffeomorphic map as a sequence of symplectomorphic maps with each map embedded in a separate energy shell. Results from multiple individuals, such as in a longitudinal study or large group study, can all be registered together in order to perform accurate statistical analysis.

In one aspect of the invention, a computer-implemented method for registration of a multi-dimensional image includes: acquiring, via an imaging system, a multi-dimensional first image defined on a fixed Cartesian grid having a plurality of locations; defining a multi-dimensional reference image on the fixed Cartesian grid; using a computer processor: receiving inputs comprising the reference image and the first image; mapping a location of the plurality of locations within the reference image and the first image to phase space using a Hamiltonian function to define a symplectomorphic map, wherein the map is embedded in an energy shell; repeating the mapping for additional locations of the plurality of locations until a sequence of energy shells is generated; generating a curvilinear mapping grid corresponding to the sequence of energy shells; applying the curvilinear mapping grid to the first image to generate registered image data; and generating an output to a display device in communication with the computer processor comprising a registered image. In a preferred embodiment, the Hamiltonian function is of the form:

$$\mathcal{H}(q, p) = \frac{1}{2V} \int \left[ p^2 + (I_0(x) - I_1(q)))^2 \right] dx,$$

where x is the fixed Cartesian grid, $I_0$ and $I_1$ are the reference and first images, respectively, V is a measure of the reference image $I_0$ domain (V≡∫dx), and (q(x,t), p(x,t)) is a set of canonical coordinates that define a time dependent mapping from Cartesian grid x to a new curvilinear grid y≡q(x,t). The method may further include, prior to mapping a location, preconditioning the plurality of locations in one or both of the first image and the reference image to account for nearest neighbor coupling between adjacent grid locations by determining entropy spectrum pathways. The method may also include prior to mapping a location, preconditioning the plurality of locations to equalize dimensionality of the reference image and the first image using spherical wave decomposition. In some embodiments, the reference image is a high resolution image and the first image is a lower resolution image. For example, the reference image and the first image may be magnetic resonance imaging (MRI) images, where the reference image is a high resolution anatomical (HRA) volume and the first image is a diffusion weighted image (DWI). In another implementation, the reference image and the first image are magnetic resonance imaging (MRI) images, where the reference image is a high resolution anatomical (HRA) volume and the first image is functional magnetic resonance image (FMRI).

In another aspect of the invention, a system for registering a multi-dimensional image includes: a memory storing computer-executable instructions; a processor in communication with the memory and configured to execute the computer-executable instructions to perform: acquiring from an imaging system a multi-dimensional first image defined on a fixed Cartesian grid having a plurality of locations; defining a multi-dimensional reference image on the fixed Cartesian grid; mapping a location of the plurality of locations within the reference image and the first image to phase space using a Hamiltonian function to define a symplectomorphic map, wherein the map is embedded in an energy shell; repeating the mapping for additional locations of the plurality of locations until a sequence of energy shells is generated; generating a curvilinear mapping grid corresponding to the sequence of energy shells; applying the curvilinear mapping grid to the first image to generate registered image data; and a display device in communication with the processor configured for receiving and displaying a registered image corresponding to the registered image data. In a preferred embodiment, the Hamiltonian function is of the form:

$$\mathcal{H}(q, p) = \frac{1}{2V} \int \left[ p^2 + (I_0(x) - I_1(q)))^2 \right] dx,$$

where x is the fixed Cartesian grid, $I_0$ and $I_1$ are the reference and first images, respectively, V is a measure of the reference image $I_0$ domain (V≡∫dx), and (q(x,t), p(x,t)) is a set of canonical coordinates that define a time dependent mapping from Cartesian grid x to a new curvilinear grid y≡q(x,t). The system may further include the processor executing computer-executable instruction to perform, prior to mapping a location, preconditioning the plurality of locations in one or both of the first image and the reference image to account for nearest neighbor coupling between adjacent grid locations by determining entropy spectrum pathways. The system may further include the processor executing computer-executable instruction to perform, prior to mapping a location, preconditioning the plurality of locations to equalize dimensionality of the reference image and the first image using spherical wave decomposition. In some embodiments, the reference image is a high resolution image and the first image is a lower resolution image. For example, the reference image and the first image may be magnetic resonance imaging (MRI) images, where the reference image is a high resolution anatomical (HRA) volume and the first image is a diffusion weighted image (DWI). In another implementation, the reference image and the first image are magnetic resonance imaging (MRI) images, where the reference image is a high resolution anatomical (HRA) volume and the first image is functional magnetic resonance image (FMRI).

In yet another aspect of the invention, a computer-implemented method for registration of a multi-dimensional image includes acquiring, via an imaging system, a multi-dimensional first image defined on a fixed Cartesian grid having a plurality of locations; defining a multi-dimensional reference image on the fixed Cartesian grid; using a computer processor for receiving inputs comprising the reference image and the first image; preconditioning the plurality of locations in one or both of the first image and the reference image to account for nearest neighbor coupling between adjacent grid locations by determining entropy spectrum pathways; preconditioning the plurality of locations to equalize dimensionality of the reference image and the first image using spherical wave decomposition; mapping a location of the plurality of locations within the reference image and the first image to phase space using a Hamiltonian function having the form:

$$\mathcal{H}(q, p) = \frac{1}{2V} \int [p^2 + (I_0(x) - I_1(q)))^2] dx,$$

where x is the fixed Cartesian grid, $I_0$ and $I_1$ are the reference and first images, respectively, V is a measure of the reference image $I_0$ domain (V≡∫dx), and (q(x,t), p(x,t)) is a set of canonical coordinates that define a time dependent mapping from Cartesian grid x to a new curvilinear grid y=q(x,t) to define a symplectomorphic map, wherein the map is embedded in an energy shell; repeating the mapping for additional locations of the plurality of locations until a sequence of energy shells is generated; generating a curvilinear mapping grid corresponding to the sequence of energy shells; applying the curvilinear mapping grid to the first image to generate registered image data; and generating an output to a display device in communication with the computer processor comprising a registered image. In some embodiments, the reference image is a high resolution image and the first image is a lower resolution image. For example, the reference image and the first image may be magnetic resonance imaging (MRI) images, where the reference image is a high resolution anatomical (HRA) volume and the first image is a diffusion weighted image (DWI). In another implementation, the reference image and the first image are magnetic resonance imaging (MRI) images, where the reference image is a high resolution anatomical (HRA) volume and the first image is functional magnetic resonance image (FMRI).

The inventive method has the ability to accurately co-register the data volumes in computational times significantly faster and more accurately than current state-of-the-art methods. The resulting image volumes also demonstrate previously unobserved image contrasts that suggest the ability of the inventive method to uncover more subtle and important structural features in the data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A shows a sphere; FIG. 1B shows a spherical shell with a hole into which the sphere in FIG. 1A is to be fitted.

FIGS. 1C and 1D show results of direct and inverse maps, respectively, obtained in 8 embedded energy shells. FIGS. 1E and 1F are plots of a subset of curvilinear grid lines for three neighboring layers selected from three orthogonal panes for direct and inverse maps, respectively.

FIG. 2B shows central planes for four volumes (our of ten subjects) used for mapping. FIG. 2C shows the average for all ten volumes. FIG. 2D illustrates the results of SWD preconditioning (fitted with orthogonal transform) for the four volumes of FIG. 2B. FIG. 2E shows the average for all ten subjects. FIG. 2F shows the result of symplectomorphic transforms using five embedded shells in FIG. 2E. FIG. 2G shows the average for all ten subjects. FIG. 2H shows the result of symplectomorphic transforms using 15 embedded shells with all ten subject averages in FIG. 2G. FIG. 2I shows plots of curvilinear grids for the same four subjects.

FIG. 3A is the reference T1 MRI image (2D center slice (upper) and 3D view (lower)); FIG. 3B is a DWI b0 MRI image (2D center slice (upper) and 3D view (lower)) and 3D view (bottom)); FIG. 3C is an equilibrium probability DWI image (same resolution as b0 image of FIG. 3B (2D center slice (upper) and 3D view (lower)); FIG. 3D is a DWI image SWD preconditioned and registered to T1 image (same resolution as T1 image) (2D center slice (upper) and 3D view (lower)). FIGS. 3E and 3F provide a side-by-side comparison of the 2D center slices for the reference (FIG. 3A) and the symplectomorphic registration of the DWI volume (FIG. 3D).

FIG. 5A shows a low resolution (64×64×30) rs-FMRI volume; FIG. 5B shows a T1 high resolution (290×262×262) anatomical volume; and FIG. 5C shows a SWD preconditioned rs-FMRI volume after registration to a high resolution T1 template.

FIGS. 6A and 6D correspond to the default mode; FIGS. 6B and 6E to visual lateral, and FIGS. 6C and 6F to visual occipital. The upper panels (a, b, and c) show the original low resolution rs-FMRI modes. The symplectomorphic maps in lower panels (d, e, and f) show accurate localizations of functional modes in the appropriate regions of HRA volumes.

DETAILED DESCRIPTION OF EXEMPLARY EMBODIMENTS

The SymReg-ESP method disclosed herein is validated on a well characterized numerical phantom and then demonstrated on a set of the "standard" neuro-MRI data acquisitions (HRA, DTI, rsFMRI) routinely collected at our UCSD Center for FMRI (CFMRI) using the 3 T GE Discovery MR750 whole body system. All data sets were previously collected to study the effects of traumatic brain injuries (TBI) and the resting state brain activity (Wong et al., 2013). A multiband DTI EPI acquisition (Setsompop et al., 2011) was used for DW data. We demonstrate the ability to accurately co-register the data volumes in computational times significantly faster and more accurately than current state-of-the-art methods. The resulting image volumes also demonstrate previously unobserved image contrasts that suggest the ability of the inventive method to uncover more subtle and important structural features in the data. SymReg-ESP builds a diffeomorphic map as a sequence of symplectomorphic maps with each map embedded in a separate energy shell.

Figure 7:
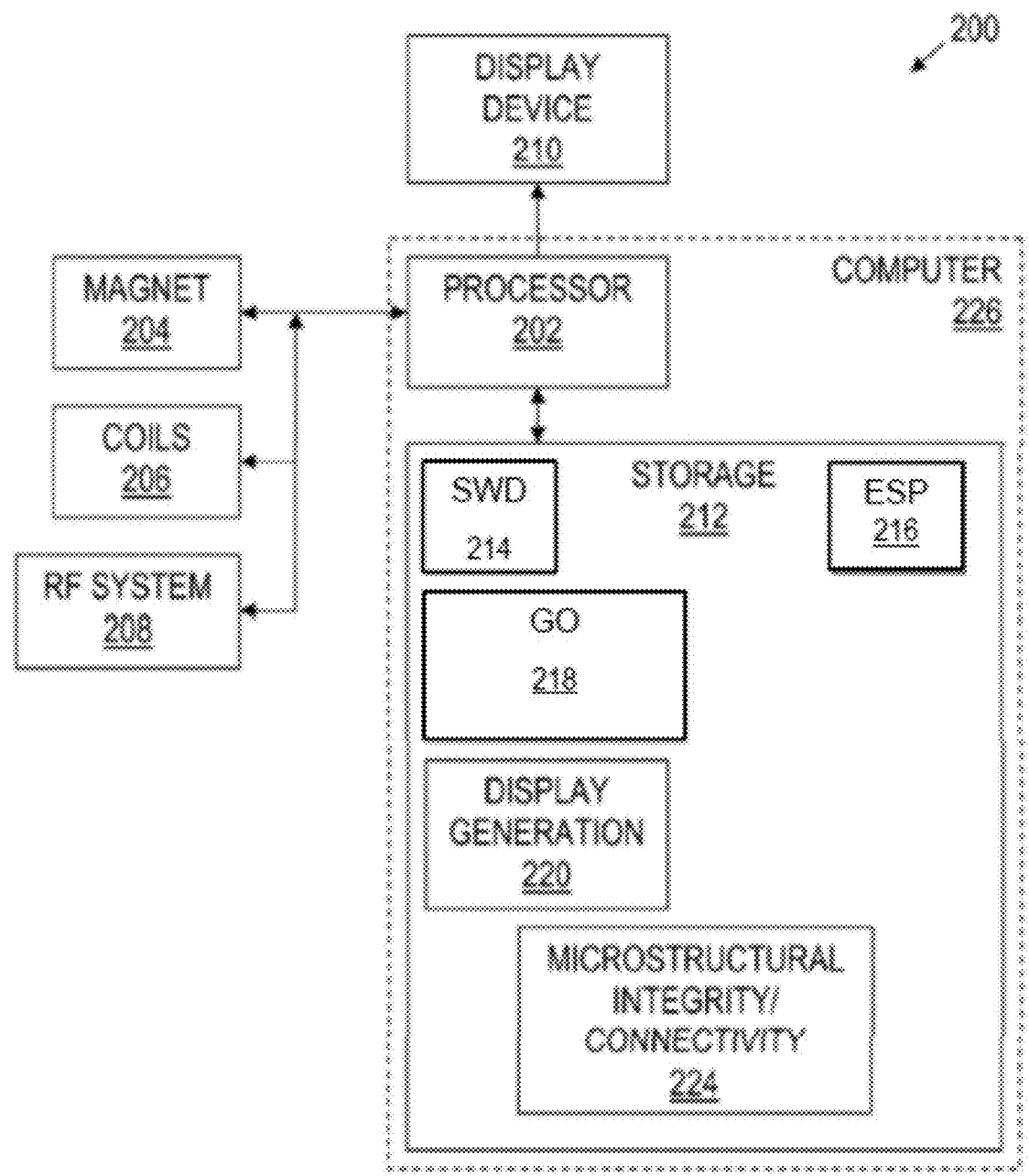
FIG. 7 is a block diagram of an exemplary imaging system in accordance with various embodiments of the invention.

FIG. 7 is a block diagram of an exemplary magnetic resonance (MR) imaging system 200 in accordance with various embodiments. The system 200 includes a main magnet 204 to polarize the sample/subject/patient; shim coils 206 for correcting inhomogeneities in the main magnetic field; gradient coils 206 to localize the MR signal; a radio frequency (RF) system 208 which excites the sample/subject/patient and detects the resulting MR signal; and one or more computers 226 to control the aforementioned system components.

A computer 226 of the imaging system 200 comprises a processor 202 and storage 212. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. The storage 212 includes a computer-readable storage medium.

Software programming executable by the processor 202 may be stored in the storage 212. More specifically, the storage 212 contains software instructions that, when executed by the processor 202, causes the processor 202 to acquire multi-shell diffusion weighted magnetic resonance (MRI) data in the region of interest ("ROI") and process it using a spherical wave decomposition (SWD) module (SWD module 214); compute entropy spectrum pathways (ESP) (ESP module 216); perform ray tracing using a geometric optics tractography algorithm (GO module 218) to generate graphical images of fiber tracts for display (e.g., on display device 210, which may be any device suitable for displaying graphic data) the microstructural integrity and/or connectivity of ROI based on the computed MD and FA (microstructural integrity/connectivity module 224). More particularly, the software instructions stored in the storage 212 cause the processor 202 to display the microstructural integrity and/or connectivity of ROI based on the SWD, ESP and GO computations.

Additionally, the software instructions stored in the storage 212 may cause the processor 202 to perform various other operations described herein. In some cases, one or more of the modules may be executed using a second computer of the imaging system. (Even if the second computer is not originally or initially part of the imaging system 200, it is considered in the context of this disclosure as part of the imaging system 200.) In this disclosure, the computers of the imaging system 200 are interconnected and configured to communicates with one another and perform tasks in an integrated manner. For example, each computer is provided access the other's storage.

In other cases, a computer system (similar to the computer 226), whether being a part of the imaging system 200 or not, may be used for post-processing of diffusion MRI data that have been acquired. In this disclosure, such a computer system comprises one or more computers and the computers are interconnected and are configured for communicating with one another and performing tasks in an integrated manner. For example, each computer has access to another's storage. Such a computer system may comprise a processor and a computer-readable storage medium (CRSM). The CRSM contains software that, when executed by the processor, causes the processor to obtain diffusion magnetic resonance (MRI) data in region of interest (ROI) in a patient and process the data by performing spherical wave decomposition (SWD), entropy spectrum pathway (ESP) analysis and applying geometric optics (GO) algorithms to execute ray tracing operations to define fiber tracts for display on a display device.

Figure 8:
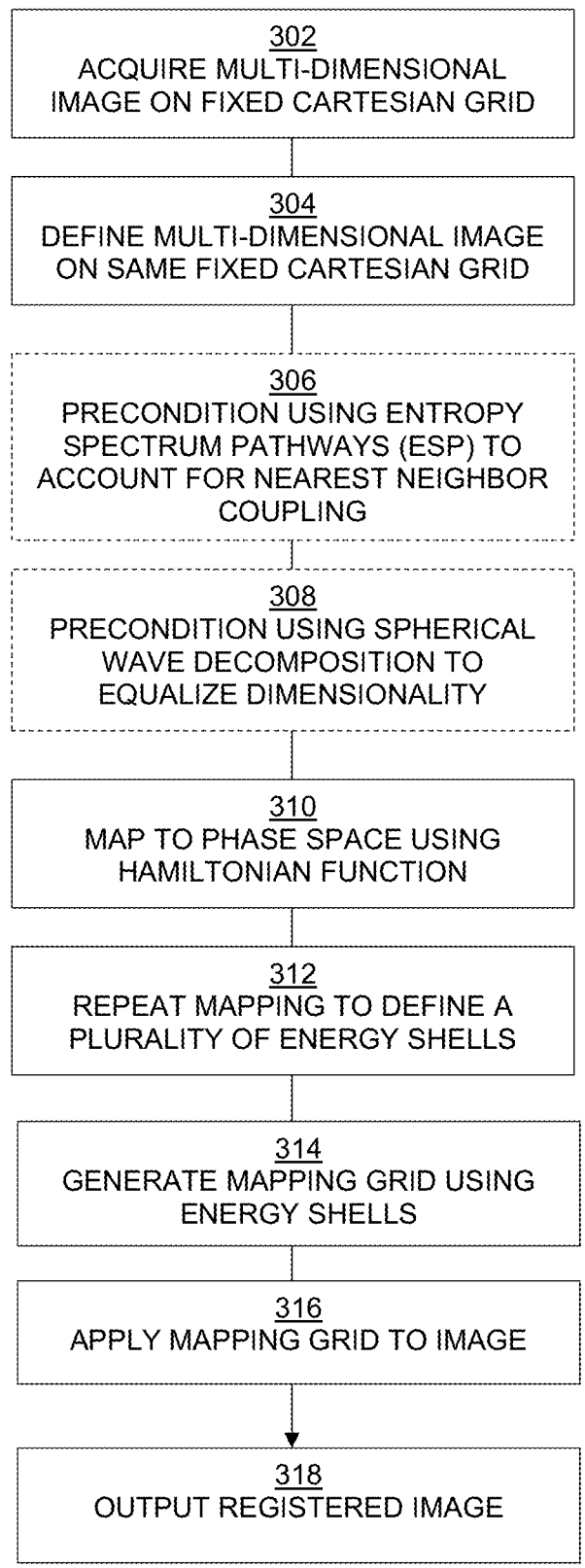
FIG. 8 is a flow diagram of an exemplary sequence in accordance with an embodiment of the invention.

FIG. 8 provides a flow diagram for the basic steps of the inventive SymReg-ESP method according to the invention. In step 302, the image to be registered is acquired from an imaging system. In the examples described herein, the imaging system may be an MRI system, e.g., system 200 in FIG. 7, which is configured to generate an image of the types described in the background section. Since an important goal of the inventive method is to allow the registration of lower resolution images to higher resolution anatomical images, for purposes of illustration, the first image may be a DWI, DTI or FMRI image. In step 304, a reference image is defined. In some examples, the reference image may be a single high resolution volume image from the same subject, e.g., HRA, T1 or other image, or it may be a collection of images from several subjects, which images may be averaged to produce an "anatomical template." Optional, but preferred, step 306 may be used to precondition the data to account for the coupling effect of neighboring points on the grid, for example, in DTI or DWI. This coupling behavior is ideally incorporated using an entropy spectrum pathways (ESP) scheme, which is disclosed in the inventor's co-pending patent application, U.S. Patent Publication No. 2016/0110911, which is incorporated herein by reference. Since the data obtained from differing imaging systems tends to have different spatial resolution, preconditioning step 308 may be utilized to equalize the dimensionality of the data. In the preferred method, spherical wave decomposition (SWD), such as described in the inventor's co-pending patent application, U.S. Patent Publication No. 2016/0225146, incorporated herein by reference, may be employed.

In step 310, the relationship between the input and reference images are mapped to phase space using a Hamiltonian function to define an energy shell, as described in detail below. Each location in the Cartesian grid is mapped through an iterative process to define a plurality of energy shells (step 312). The resulting energy shells are used to create a curvilinear grid (step 314) that will be used as a map that can be applied to the input image in step 316 to create a registered image. In step 318, the registered image may then be displayed on a display device to allow the visualization of, for example, functional data from DTI or DWI, with reference to accurate anatomical features obtained using HRA. The details of the individual steps of the inventive SymReg-ESP process are provided below.

For implementation of symplectomorphic mapping, we introduce Hamiltonian function $\mathcal{H}(q,p)$ on a fixed Cartesian grid x as $$\mathcal{H}(q, p) = \frac{1}{2V}\int [p^2 + (I_0(x) - I_1(q))^2] dx. \quad (1)$$

Here $I_0$ and $I_1$ are two multidimensional images defined on the same fixed Cartesian grid x, V is the measure (volume) of the reference $I_0$ image domain ($V \equiv \int dx$), and $(q(x,t), p(x,t))$ is a set of canonical coordinates, that define a time dependent mapping from Cartesian grid x to a new curvilinear grid $y \equiv q(x,t)$, such that initially at $t=0$ the grids are identical, i.e. $(q(x,0), p(x,0)) \equiv (x,0)$.

The Hamiltonian Eq. (1) defines a flow at each location on fixed grid through a system of Hamilton's equations $$\frac{dq}{dt} = \frac{\delta \mathcal{H}}{\delta p} \equiv p \quad (2)$$

$$\frac{dp}{dt} = -\frac{\delta \mathcal{H}}{\delta q} \equiv (I_0 - I_1)\frac{\partial I_1}{\partial q} \quad (3)$$

where $\delta H/\delta \ldots$ denotes variational (or functional) derivative.

The flow defined by Eqns (2) and (3) is called a Hamiltonian flow and takes places in the space of the coordinates (q,x), which is called phase space. Diffeomorphisms in this phase space are called Hamiltonian diffeomorphisms, or "symplectomorphisms", since a phase space is a symplectic manifold. Thus, symplectomorphisms preserve the symplectic structure (including the volume) of phase space. This is an important feature that will allow the generation of a shell-like sequence of transformations suitable for volumetric measurements and quantifications.

Because the Hamiltonian function Eqn (1) and the reference image $I_0$ are defined on a Cartesian grid x we do not calculate the curvilinear gradient $\partial I_1/\partial q$ directly. Instead, we express $I_1(q)$ and a function on Cartesian grid $I_1(q(x,t))$ and use chain rule to evaluate the curvilinear gradient through a gradient on Cartesian grid $\partial I_1/\partial x$ and Jacobian $J \equiv \partial q/\partial x$ as $\partial I_1/\partial x (\partial q/\partial x)^{-1}$.

An evolution of the Jacobian with time can be obtained by differentiating the position equation (Eqn. (2)) on a fixed grid giving a closed set of equations $$\frac{dq}{dt} = p \quad (4)$$

$$\frac{dp}{dt} = (I_0 - I_1)\frac{\partial I_1}{\partial x} J^{-1} \quad (5)$$

$$\frac{dJ}{dt} = \frac{\partial p}{\partial x} \quad (6)$$

Integrating these equations with initial conditions $q(x,0)=x$, $p(x,0)=0$, and $J(x,0)=1$ generates a symplectomorphic transformation $x \to q(x,t)$. A new metric can be defined for the position part q of the canonical coordinates by introducing the metric tensor $G=\{g_{ij}\}=J^T J$. The metric tensor is important for providing accurate measures of line and surface properties using the curvilinear coordinate system q. For example, a length of a curve parameterized by x(t) with a parameter t between zero and one in Cartesian space can be expressed using the metric tensor and curvilinear mapping as $$\int_0^1 \left|\frac{dx}{dt}\right| dt = \int_0^1 \sqrt{g_{ij}\frac{dq^i}{dt}\frac{dq^j}{dt}} dt, \quad (7)$$

where repeated indices i and j represent summation.

To ensure that the transformation is symplectomorphic at every location on the fixed grid x during numerical integration, we set a small constant ε and impose a requirement that both the Jacobian and the inverse Jacobian are bounded by this constant, i.e.

$$\varepsilon < |J(x,t)| < \varepsilon^{-1}, \quad (8)$$

For practical implementations only the first inequality is required. When the Jacobian becomes sufficiently close to zero, the further integration does not make sense as it will not be able to guarantee either symplectomorphic or diffeomorphic property of the flow (even numerical stability of the solution can be compromised). Therefore, when the condition of Eqn. (8) is violated, we stop numerical integration, freeze the flow, and restart the integration, thus initiating a new energy shell. Repeating this multiple times with shell-like sequence of initial conditions $$q^{(n)}(x,0)=q^{(n-1)}(x,t^{(n)}-t^{(n-1)}), \quad (9)$$

$$p^{(n)}(x,0)=0, \quad (10)$$

$$J^{(n)}(x,0)=\mathbb{1} \quad (11)$$

generates a set of shell-embedded symplectomorphic transformations such that the total transformation is diffeomorphic with the Jacobian defined as a product of $J^{(n)}$ $$J(x,t)=J^{(n)}(x,t-t^{(n)})\cdot J^{(n-1)}(x,t^{(n)}-t^{(n-1)})\cdot \ldots \cdot J^0(x,t^{(1)}) \quad (12)$$

Since the Hamiltonian is an operator that describes the "energy" of a system, we refer to these as "energy shells."

The number of shells n does not have to be introduced in advance and can be determined based on overall convergence (or even devised from running time constraints). In our numerical implementation, the shells were terminated as soon as the $I_1 \to I_0$ convergence condition $$\int [(I_0(x)-I_1(q^{(n)}))^2 - (I_0(x)-I_1(q^{(n-1)}))^2] dx < 0 \quad (13)$$

was not satisfied.

The form of Hamiltonian function used in Eqn (1) assumes only local input from difference between $I_0$ and $I_1$ images to the flow momentum p at every point on the fixed grid x. A more reasonable assumption would be an inclusion of some information relevant to the structure of $I_0$ and $I_1$ images. One possible (and by far the most straightforward) way to provide this structure-based preconditioning would be the entropy spectrum pathways (ESP) approach that takes into account nearest neighbor coupling between adjacent grid locations for phase space regularization.

The ESP approach starts with generating the coupling density $Q(x,x')$, which can be as simple as the adjacency matrix, or may in general include a strength of coupling through some kind of coupling potentials that may depend on the grid positions. The ESP approach solves the generalized eigenvalue problem $$\lambda\psi(x)=\int Q(x,x')\psi(x')dx', \quad (14)$$

finding the largest eigenvalue $\lambda$ and correspondent eigenvector $\psi(x)$ and then constructs the quantity $$\rho(x', x) = \frac{Q(x, x')\psi(x')}{\lambda\psi(x)} \quad (15)$$

calling it the transition probability density for transition between grid locations x and x'. The square of the eigenvector $\psi(x)$ is called the equilibrium probability $\mu(x)$ in a sense that it represents the stationary solution that satisfies the stationary point condition $$\mu(x')=\int\rho(x',x)\mu(x)dx \quad (16)$$

Eqn. (15) can be included in Eqn. 1 to take into account non-local effects and provide a way of regularization by defining a non-local Hamiltonian $$\mathcal{H}^{nl}(q, p) = \frac{1}{2V} \int\int [\delta(x, x')p^2 + \rho(x, x')(I_0(x') - I_1(q)))^2]dxdx', \quad (17)$$

where $\delta(x,x')$ is Dirac delta function. This non-local expression for the Hamiltonian function produces non-local Hamilton's equations $$\frac{dq}{dt} = p \quad (18)$$

$$\frac{dp}{dt} = \int\left[\rho(x, x')(I_0 - I_1)\frac{\partial I_1}{\partial x}J^{-1}\right]dx' \quad (19)$$

$$\frac{dJ}{dt} = \frac{\partial p}{\partial x}, \quad (20)$$

where momentum equation (Eqn (19)) now includes the convolution of local potential (gradient of squared image difference in our case) with a kernel $\mu(x,x')$ that depends on coupling between grid locations.

Assuming that the coupling density $Q(x,x')$ does not depend on position x but depends only on a difference between them (i.e., $Q(x,x')\equiv Q(x-x')$), the ESP scheme can provide a variety of position independent regularization kernels often used as convolution filters in image registration. As a trivial example, an eigenvalue problem (Eqn (14)) for position independent Gaussian coupling density $Q(x-x')=\exp(-(x-x')^T S(x-x')))$ in infinite n-dimensional domain has maximum eigenvalue $\sqrt{\lambda}=\pi^n/\det S$ and a trivial eigenvector $\psi(x)$=const, resulting in the commonly used Gaussian regularization kernel.

We would like to stress that for the ESP regularization it is not only possible, but very advantageous, to use coupling that incorporates information from either or both of $I_0$ and $I_1$ images. The position-dependent coupling naturally creates image dependent regularization. Moreover, any information that is not present in the images themselves but known a priori and related to images in some quantitative way can be easily included into the coupling scheme with some sort of linear or nonlinear parameterization. This provides great flexibility for tailoring the method to specific applications.

In an embodiment of the inventive method, spherical wave decomposition can be used as a position domain preconditioning operation.

The set of Hamilton's equations (Eqns. (18) to (20)) used in the previous steps to generate a sequence of energy shell-embedded symplectomorphic transformations (Eqn (12)) requires equal dimensionality of images $I_0$ and $I_1$. However, in many cases, the images to be registered are of different spatial resolutions so that some form if interpolation is required. To provide an effective way to do position domain resampling, interpolation, filtering and estimation of best orthogonal transform in a single step we used the spherical waves decomposition (SWD) approach.

The SWD approach uses fast algorithms to expand both $I_0$ and $I_1$ images in spherical wave modes $$f_{lmn}^{\{0,1\}} = \int_0^a\int_0^\pi\int_0^{2\pi} I_{\{0,1\}}(r,\theta,\phi)R_{nl}(r)Y_l^{m*}(\theta,\phi)r^2 dr\sin\theta d\theta d\phi, \quad (21)$$

where $Y_l^{m*}(\theta,\phi)$ are the spherical harmonics, and $R_{nl}(r)$ can be expressed through the spherical Bessel function $$R_{ln}(r) = \frac{1}{\sqrt{N_{ln}}} j_l(k_{ln}r), \quad (22)$$

with an appropriate choice of normalization constants $N_{ln}$ and the discrete spectrum wave numbers $k_{ln}$ determined by the boundary conditions. The number of modes (l,m=0 . . . $L_{max}$, and n=1 . . . $N_{max}$) are determined by the highest image resolution. The interpolation and resampling are then implemented as fast inverse spherical wave transform $$I_{\{0,1\}}^{NL}(r,\theta,\phi) = \sum_{n=1}^{N}\sum_{l=0}^{L}\sum_{m=-l}^{l} \mathcal{F}_{lmn}f_{lmn}^{\{0,1\}}R_{ln}(r)Y_l^m(\theta,\phi), \quad (23)$$

using appropriate grid locations $(r,\theta,\phi)$ and assigning $f_{lmn}$ to zeros for modes with $n>N_{max}$ or $l,m>L_{max}$. A variety of low/band/high pass filters can be used for frequency domain filter $\mathcal{F}$ following standard image processing techniques.

The scale and the amount of rigid rotation between images can be easily and effectively estimated using decomposition of the radial and spherical parts using the partial transforms $$I_{\{0,1\}}^N(r) = \frac{1}{2\sqrt{\pi}}\sum_{n=1}^{N}\frac{1}{\sqrt{N_{0n}}}\mathcal{F}_{00n}f_{00n}^{\{0,1\}}j_0(k_{0n}r), \quad (24)$$

-continued $$I_{\{0,1\}}^L(\theta, \phi) = \sum_{l=0}^{L} \frac{1}{\sqrt{\mathcal{N}_{l1}}} \sum_{m=-l}^{l} \mathcal{F}_{lm1} f_{lm1}^{\{0,1\}} Y_l^m(\theta, \phi), \quad (25)$$

and finding the parameters of rigid transformation (scale $S_r$ and rotation angles $\theta_r$ and $\phi_r$) by solving the two (one and two dimensional) minimization problems:

$$s_r = \underset{s_r}{\mathrm{argmin}} \int_0^{R_{max}} \left[ (I_0^N(r))^2 - (I_1^N(s_r r))^2 \right] dr, \quad (26)$$

$$(\theta_r, \phi_r) = \underset{\theta_r \phi_r}{\mathrm{argmin}} \int_0^{2\pi} \int_0^{\pi} \left[ (I_0^L(\theta, \phi))^2 - (I_1^L(\theta - \theta_r, \phi - \phi_r))^2 \right] d\theta \, d\phi, \quad (27)$$

using a small number of modes ($L<L_{max}$ and $N<N_{max}$) for initial coarse search and increasing them to refine the estimate, thus avoiding being trapped in local minima and at the same time creating computationally efficient approach. Criteria similar to the considerations about optimal order of SWD transform can be used as a stopping condition for this scale refinement procedure.

The following examples illustrate application of the SymReg-ESP method to representative image data:

Example 1: Phantom Data Registration

Figure 1A:
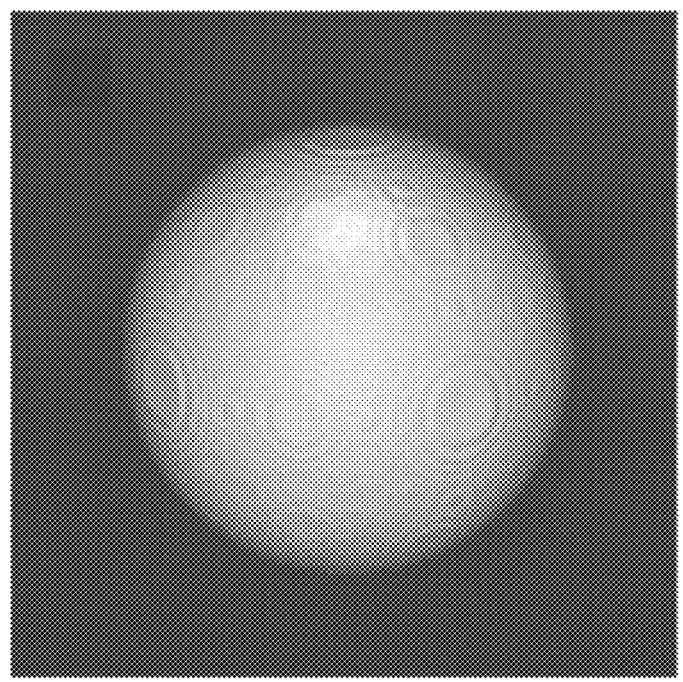
FIGS. 1A-1F illustrate a 3D extension of the classical "toy" example used for benchmarking of diffeomorphic registration, where
Figure 1B:
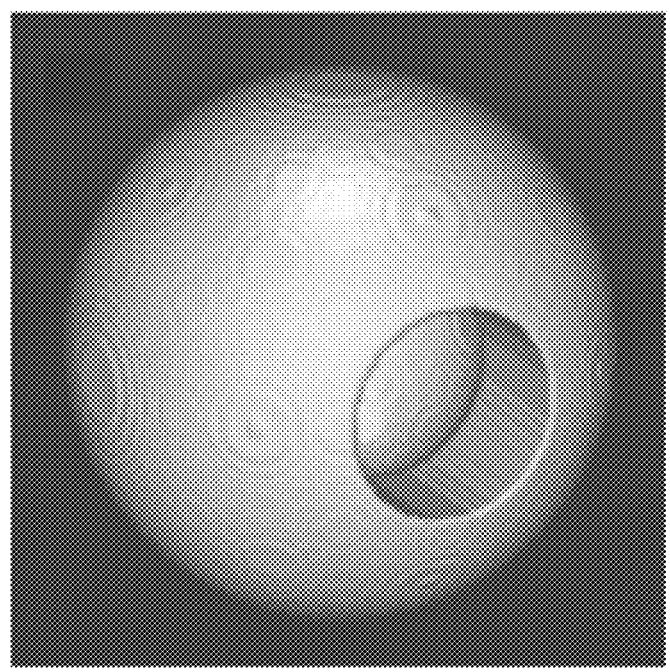
Figure 1C:
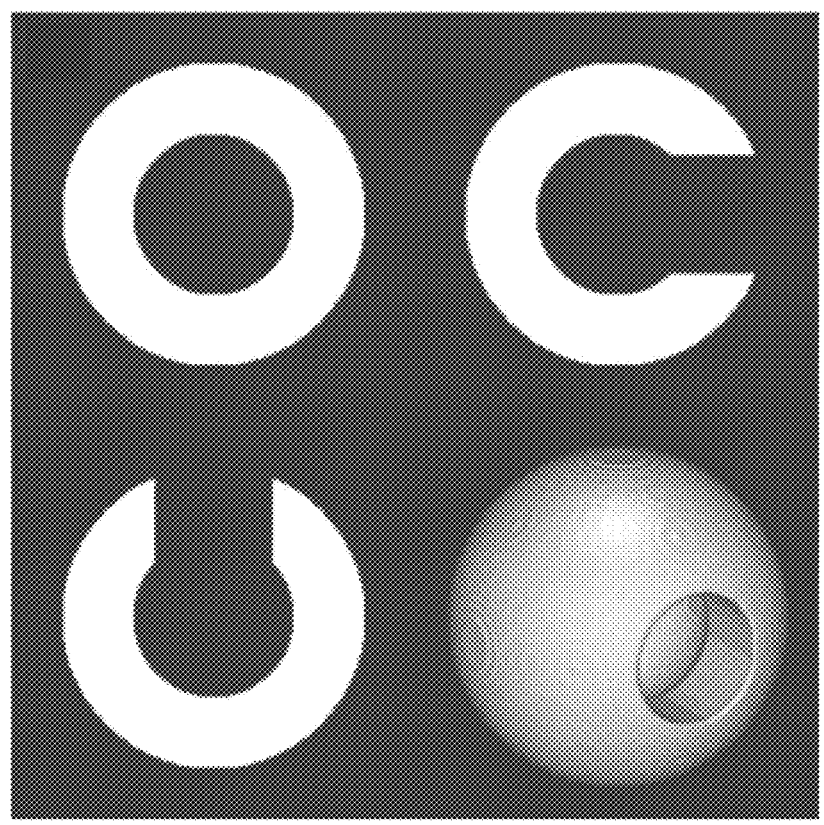
Figure 1D:
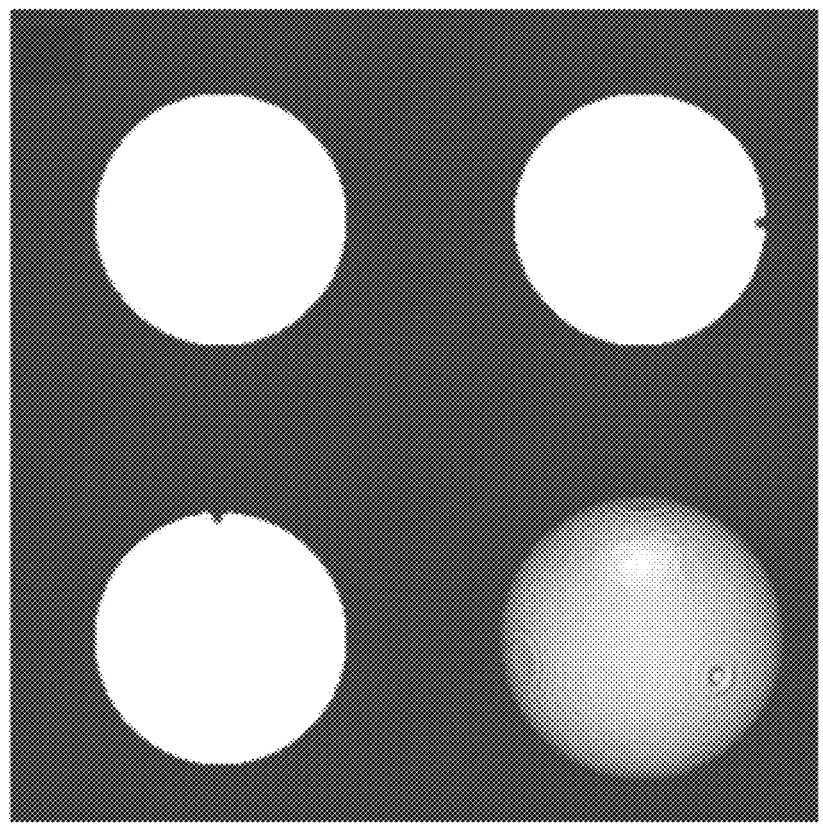
Figure 1E:
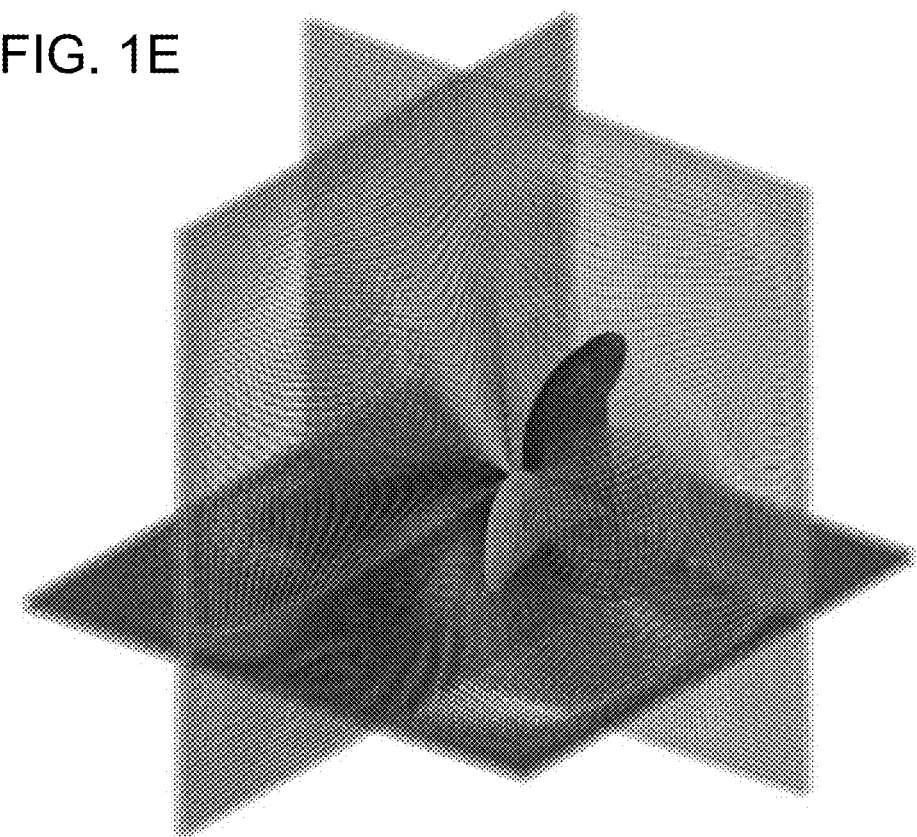
Figure 1F:
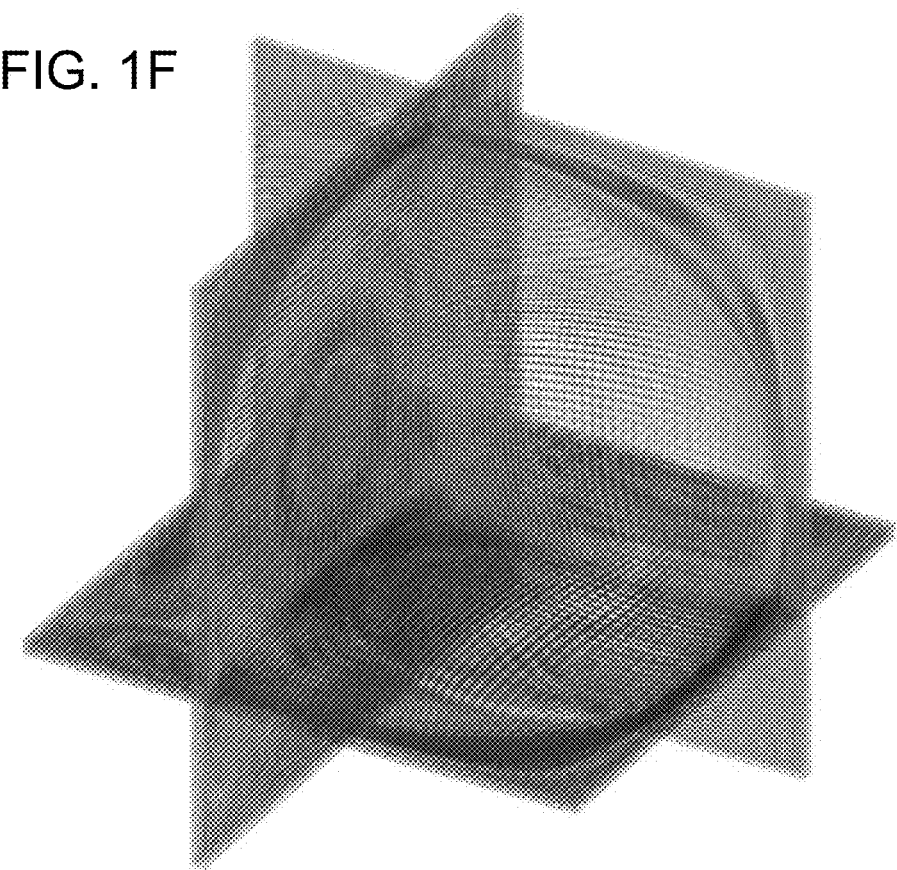

To test the SymReg-ESP approach, we first applied it to a three-dimensional (3D) extension of a classical "toy" example commonly used to show the performance of non-linear registration approaches—the registration of a "C" shape to a "circle" shape. The original 200×200×200 3D "C" and "circle" volumes are shown in FIGS. 1A and 1B, respectively. FIGS. 1C and 1D show a 3D view in their respective lower right corners and central slices for the forward and inverse maps, respectively, of the volumes. FIGS. 1E and 1F illustrate grid lines for a subset of points selected from three groups of orthogonal planes, where FIG. 1E corresponds to the direct map and FIG. 1F corresponds to the inverse map. The overall performance of our approach seems to be good, with a nearly perfect forward map of the "circle" to the "C" shape (FIG. 1C), and only a slight signature of the original hole in the inverse map of "C" shape to the "circle" (FIG. 1D). No SWD preconditioning was used in this example and a simple adjacency type matrix was used for phase space coupling. Both inverse and direct maps (FIGS. 1F and 1E, respectively) were obtained in a single computer processing run. The processing time for 200×200×200 volumetric datasets was just above 30 seconds on 12 cores INTEL Core™ i7-4930K CPU, 3.40 GHz.

Example 2: High Resolution Anatomical Data Registration

For a more complex test of the SymReg-ESP approach, we registered a set of high resolution anatomical (HRA) images to a common reference image. We utilized HRA data collected on the 3 T GE Discovery MR750 whole body system at the UCSD Functional MRI (CFMRI) using a 32 channel head coil for ten different subjects. The images had been previously collected in conjunction with a study to determine the effects of caffeine on the resting state brain activity. (Wong et al., 2013). Only high resolution T1 data (all having 290×262×262 voxel resolution) were used for the registration test in this example.

Figure 2A:
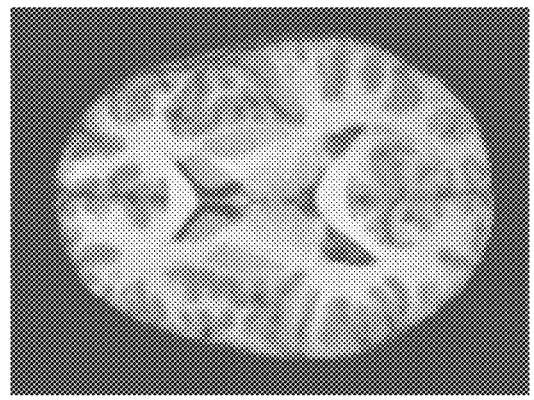
FIGS. 2A-2I show the results of HRA mapping to the anatomical reference volume of FIG. 2A.
Figure 2B:
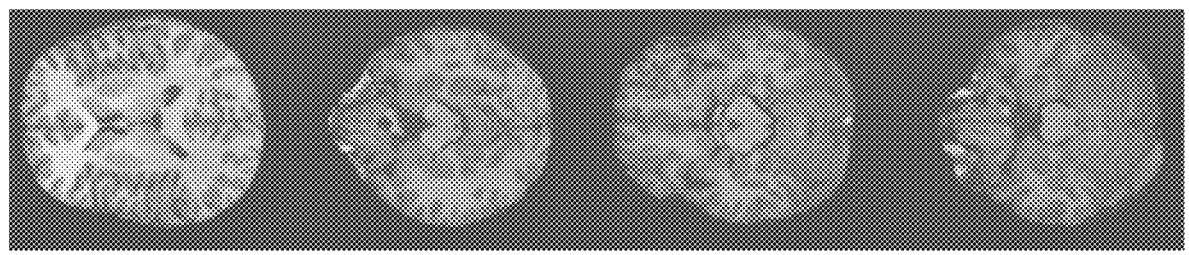
Figure 2C:
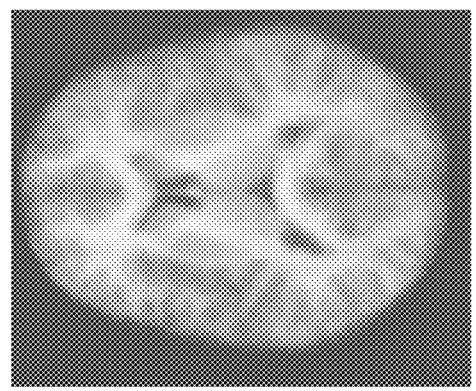
Figure 2D:
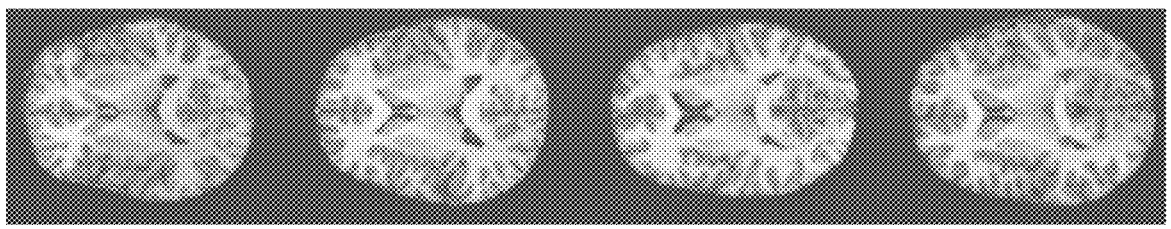
Figure 2E:
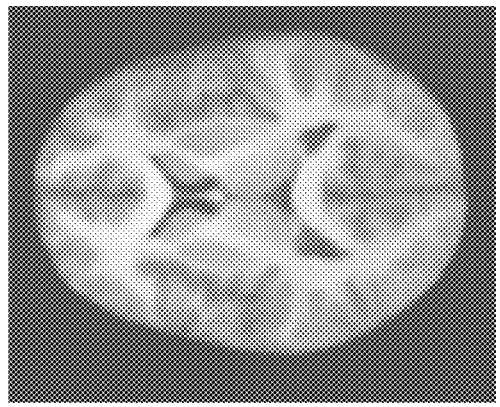
Figure 2F:
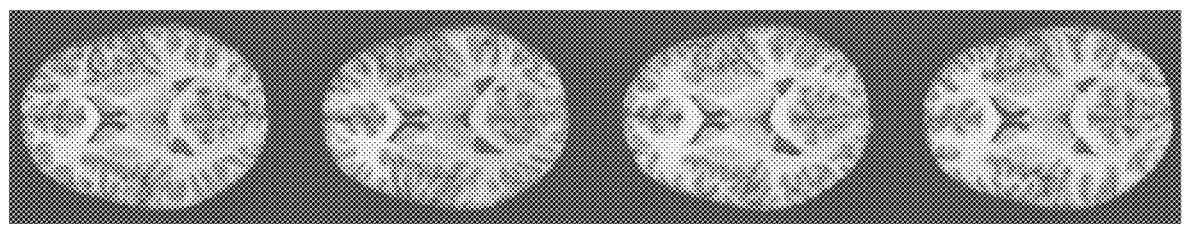
Figure 2G:
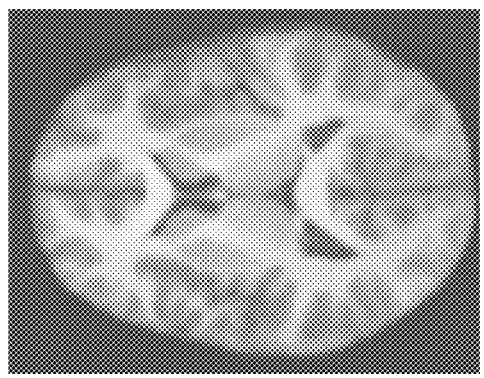
Figure 2H:
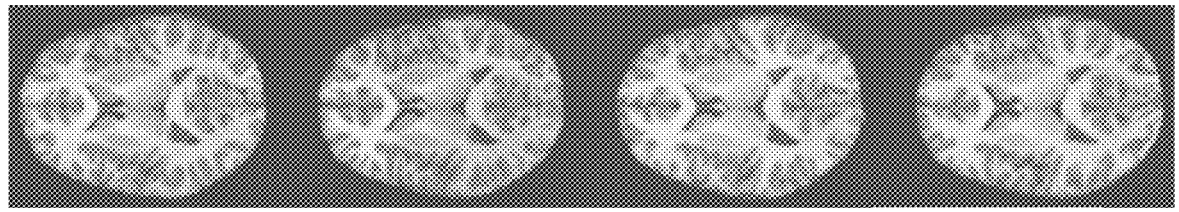
Figure 2I:
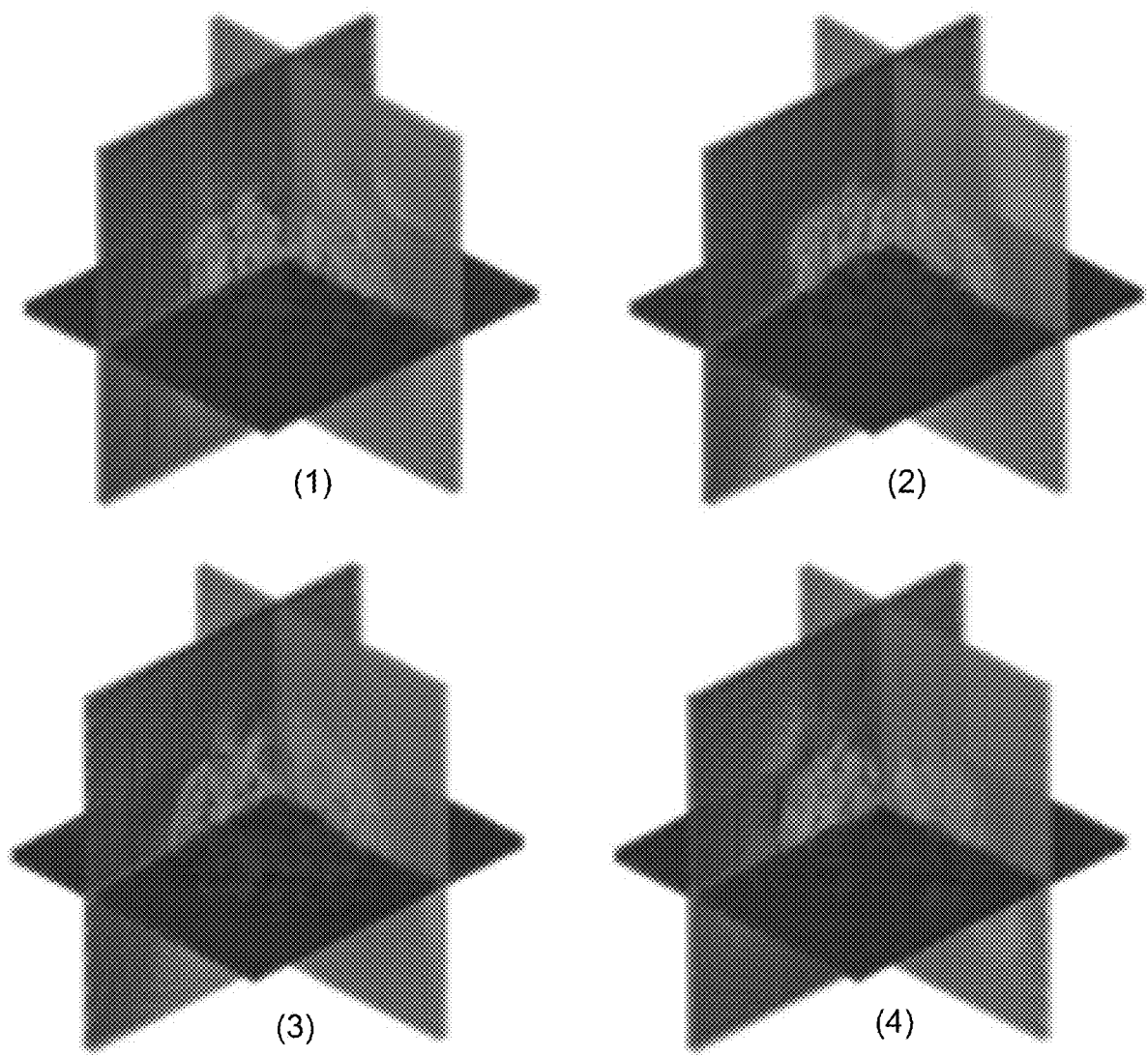

FIGS. 2A-2G are images corresponding to this registration test. The central plane from anatomical volume used as reference is shown in FIG. 2A. The same location planes for four volumes randomly selected from those of ten subjects in the Wong study are shown in FIG. 2B. FIG. 2D shows the result of a SWD preconditioning step equivalent to rigidly fitting each volume to reference with an orthogonal transform that includes rotation and uniform scaling for the same four volumes. FIG. 2C shows the result obtained from averaging the SWD preconditioned volumes for all ten subjects. The next four panels show results of symplectomorphic transforms using five (FIG. 2F) and fifteen (FIG. 2H) embedded energy shells with the corresponding ten-subject averages shown in FIG. 2E and FIG. 2G, respectively. FIG. 2I shows illustrative plots of curvilinear grids for the same randomly chosen four subjects (indicated as (1) through (4).)

Overall, as it would be expected, the symplectomorphic registration shows significant improvement over rigidly fitted volumes. Additional improvement can be obtained by increasing the number of energy shells used in the registration, as seen from FIGS. 2F and 2H. The total processing time for all ten subject fitting ranges from 15 to 40 minutes, depending on selected quality, when running the registration on 12 cores Intel Core™ i7-4930K CPU 3.40 GHz).

Example 3: Diffusion Weighted (DW) Image Registration

As a next test we completed a task of registering differing-resolution diffusion weighted (DW-MRI) and HRA images of the same subject. The data was again collected by the UCSD Center for Functional MRI (CFMRI) using 3 T GE Discovery MR750 whole body system to study the effects of traumatic brain injuries (TBI). The HRA T1 volume has 168×256×256 voxel size with 1.2×0.9375×0.9375 mm resolution.

A multiband DTI EPI acquisition using three simultaneous slice excitations was used to acquire data with three diffusion sensitizations (at b-values b=1000/2000/3000 s/mm$^2$) for 30, 45 and 65 different diffusion gradients (respectively), uniformly distributed over a unit sphere. Several baseline (b=0) images were also recorded. The data were reconstructed offline using the CFMRI's multiband reconstruction routines. The DWI data has 100×100×72 voxel size with 2 mm3 resolution.

Figure 3A:
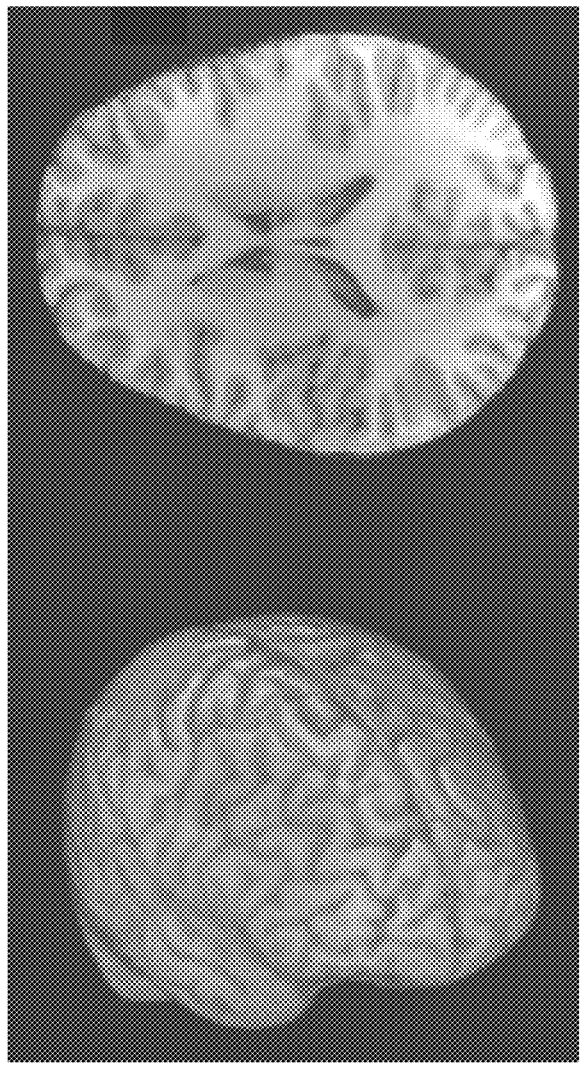
FIGS. 3A-3F show medium resolution (100×100×72) diffusion weighted (DWI) volume registration to a high resolution (168×256×256) T1 reference, where
Figure 3B:
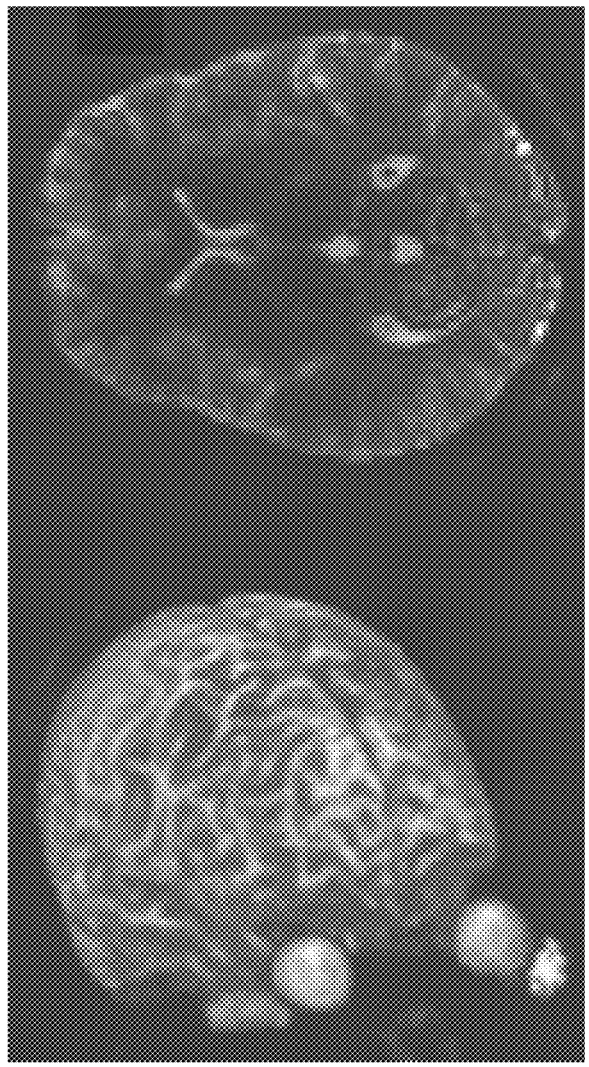
Figure 3C:
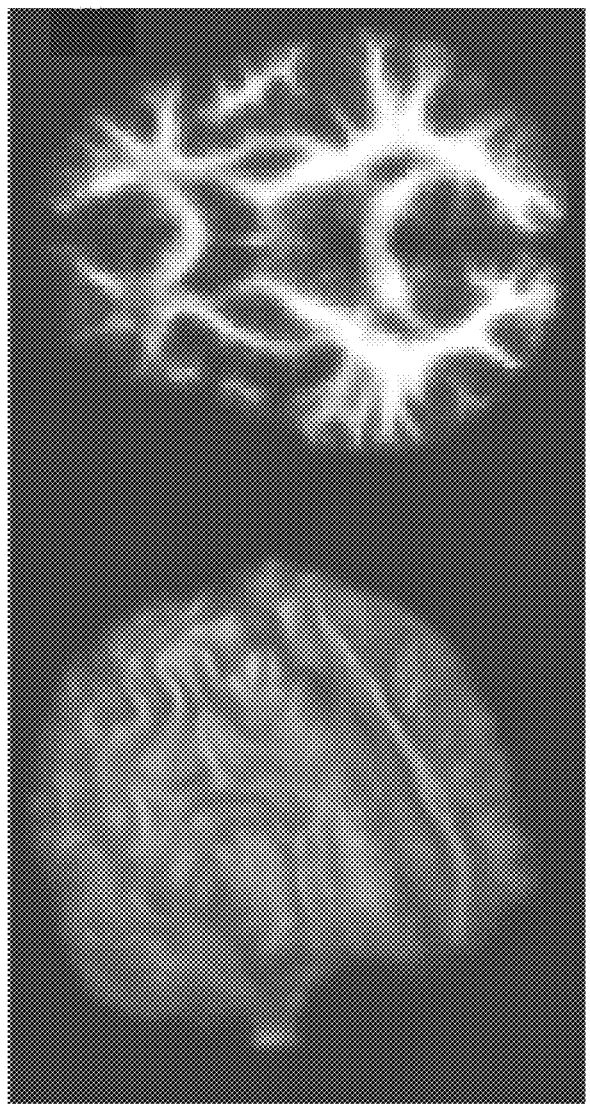
Figure 3D:
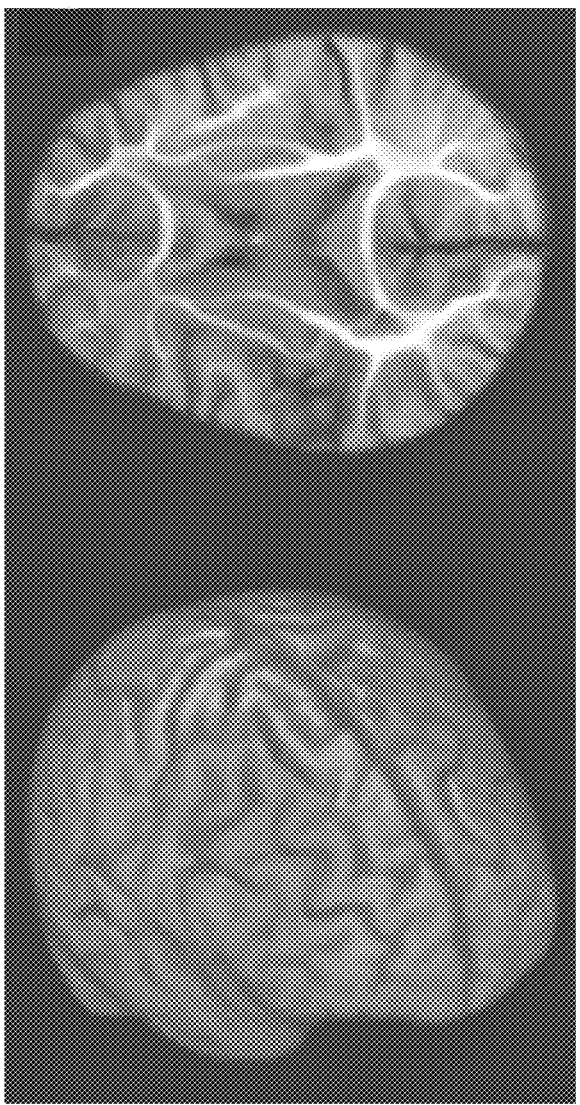
Figure 3E:
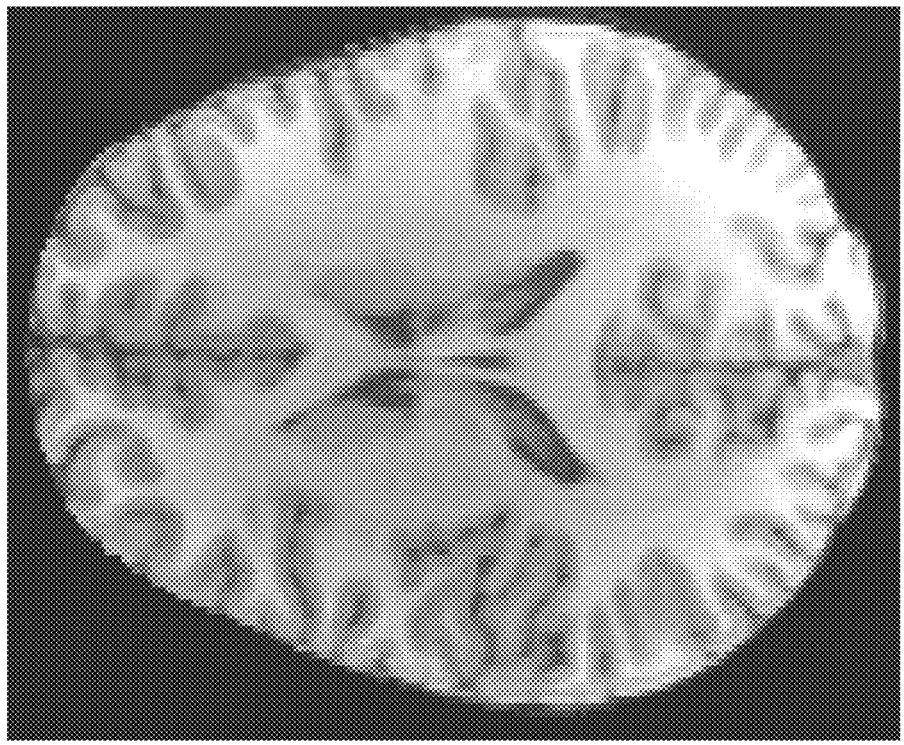
Figure 3F:
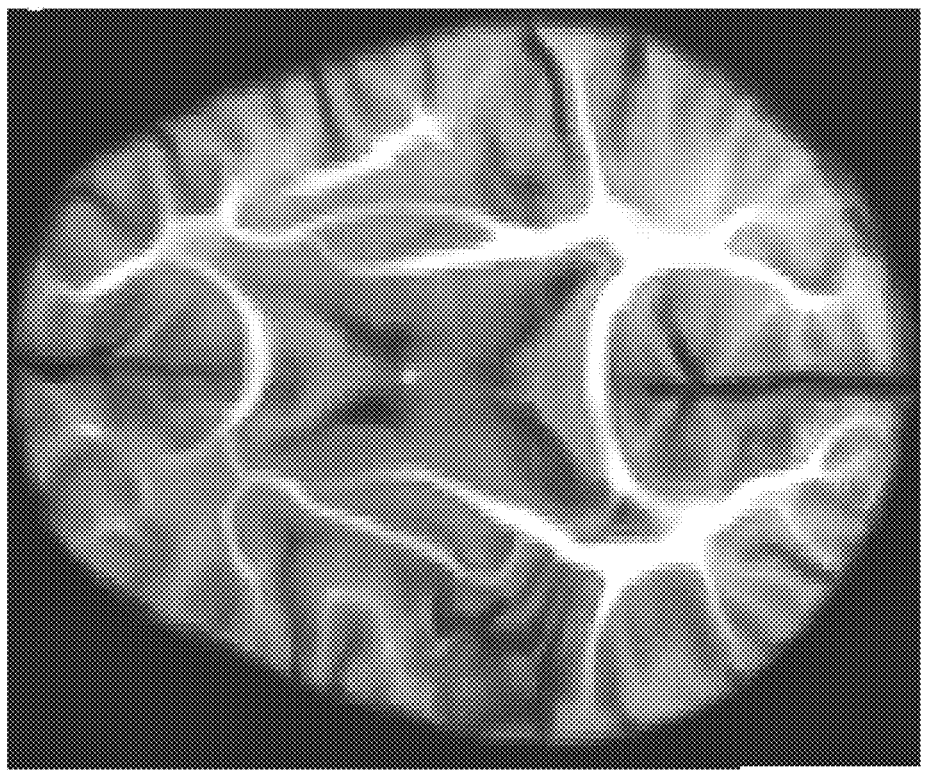

FIG. 3A shows a central slice (upper) and 3D view (lower) of the reference volume. The DWI b=0 volume is shown in FIG. 3B, again with the central slice in the upper portion of the panel, 3D view in the lower part. The DWI equilibrium probability volume with the same resolution as the b=0 volume of FIG. 3B is shown in FIG. 3C. The final symplectomorphic registration of DWI equilibrium probability volume is provided in FIG. 3D. FIGS. 3E and 3F provided an enlarged side-by-side comparison of the HRA reference and transformed DWI with the same resolution.

Figure 4A:
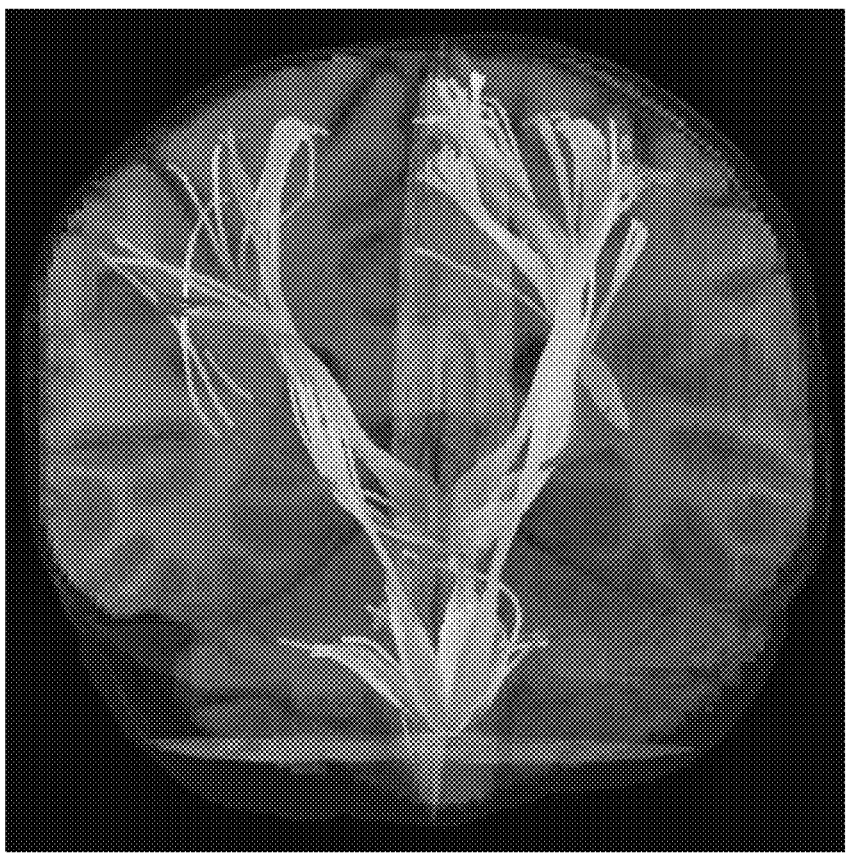
FIGS. 4A and 4B shows two examples of diffusion weighted tractography that used the GO-ESP technique modified by addition of a HRA dataset through inverse symplectomorphic mapping to the diffusion weighted data.
Figure 4B:
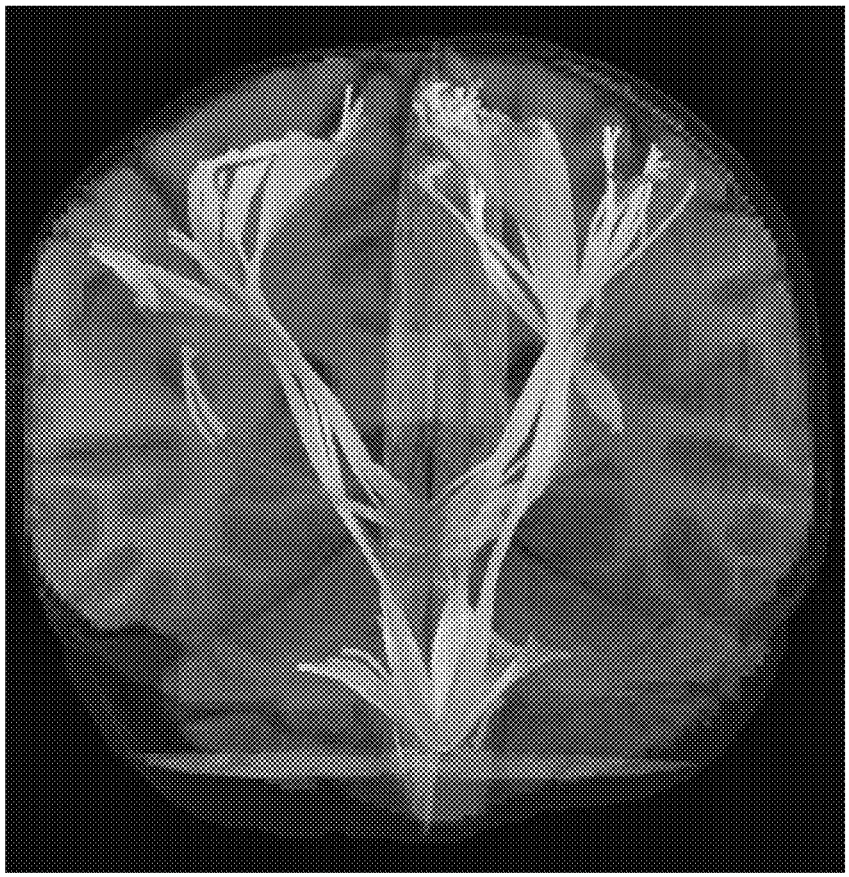

Two examples of DW tractography that employed the GO-ESP technique modified by addition of the HRA dataset through inverse symplectomorphic mapping to the DWI data are shown in FIGS. 4A and 4B, respectively. These figures demonstrate that the symplectomorphic registration method facilitates accurate localization of diffusion-derived tracks with the high resolution anatomical features provided in HRA images. It should be noted that details of the tractography implementation are known in the art are not separately described here.

A considerable amount of work has been spent recently not only on spatial registration of diffusion imaged volumes, but also on devising techniques for local reorientation of diffusion tensors that would be consistent with the new deformed spatial grid. These methods are both time consuming and involve an unnecessary intermediate step when viewed in the context of the inventive method. An important feature of the SymReg-ESP method is that we can directly import the diffeomorphic maps together with the high resolution data into our diffusion estimation and tractography technique GO-ESP, providing a fast and effective way of adding an increased level of detail to relatively low resolution output available from diffusion weighted (DW) tractography.

Example 4: Registration of Functional Images

We used low spatial resolution functional rs-FMRI data from the same caffeine study dataset used in the preceding examples (Wong, et al., 2013). Only the data collected prior to caffeine administration were used. Whole brain BOLD resting-state data were acquired over thirty axial slices using an echo planar imaging (EPI) sequence (flip angle=70°, slice thickness=4 mm, slice gap=1 mm, FOV=24 cm, TE=30 ms, TR=1.8 s, matrix size=64×64×30). All data were pre-processed using the standard pre-processing analysis pathway at the CFMRI. Nuisance terms were removed from the resting-state BOLD time series through multiple linear regression. These nuisance regressors included: i) linear and quadratic trends, ii) six motion parameters estimated during image co-registration and their first derivatives, iii) RETROICOR (2nd order Fourier series) and RVHRCOR physiological noise terms calculated from the cardiac and respiratory signals, and iv) the mean BOLD signals calculated from WM and CSF regions and their first respective derivatives, where these regions were defined using partial volume thresholds of 0.99 for each tissue type and morphological erosion of two voxels in each direction to minimize partial voluming with gray matter.

Figure 5A:
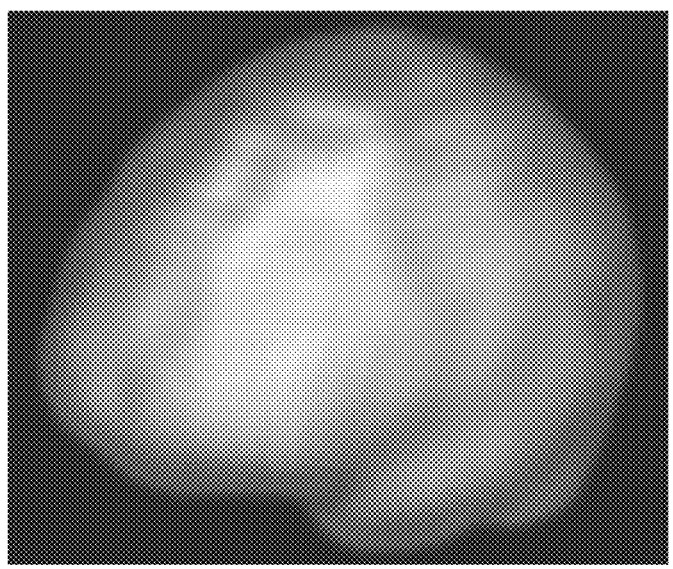
FIGS. 5A-5C are 3D views of a brain, where
Figure 5B:
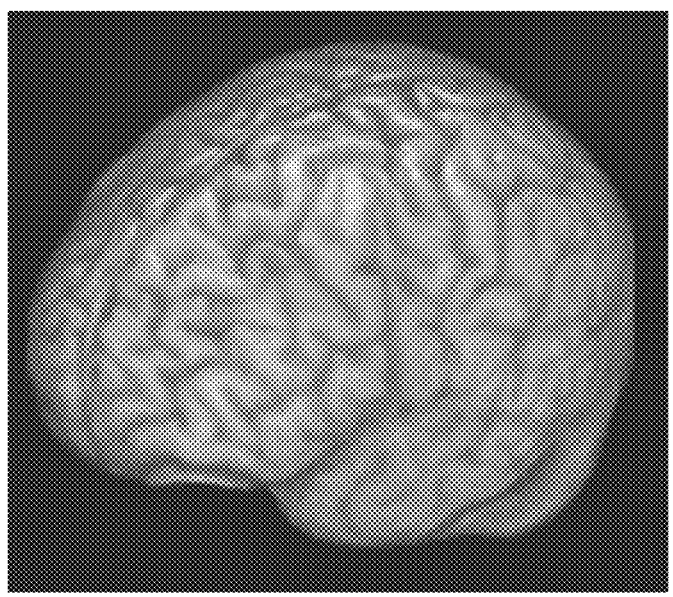
Figure 5C:
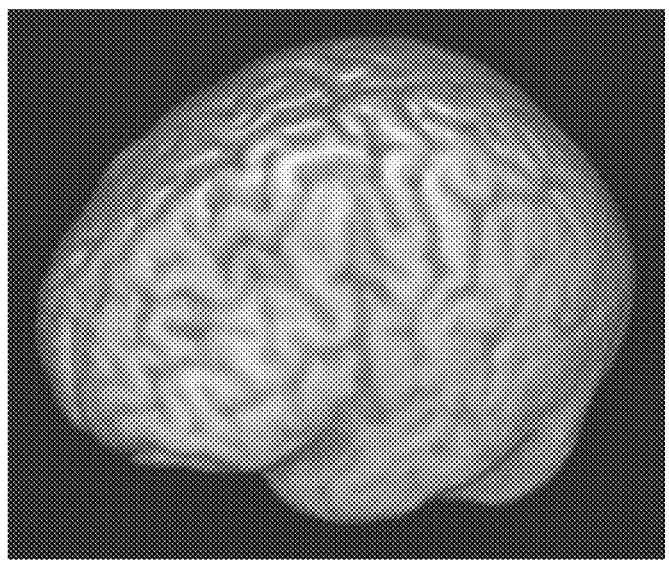
Figure 5D:
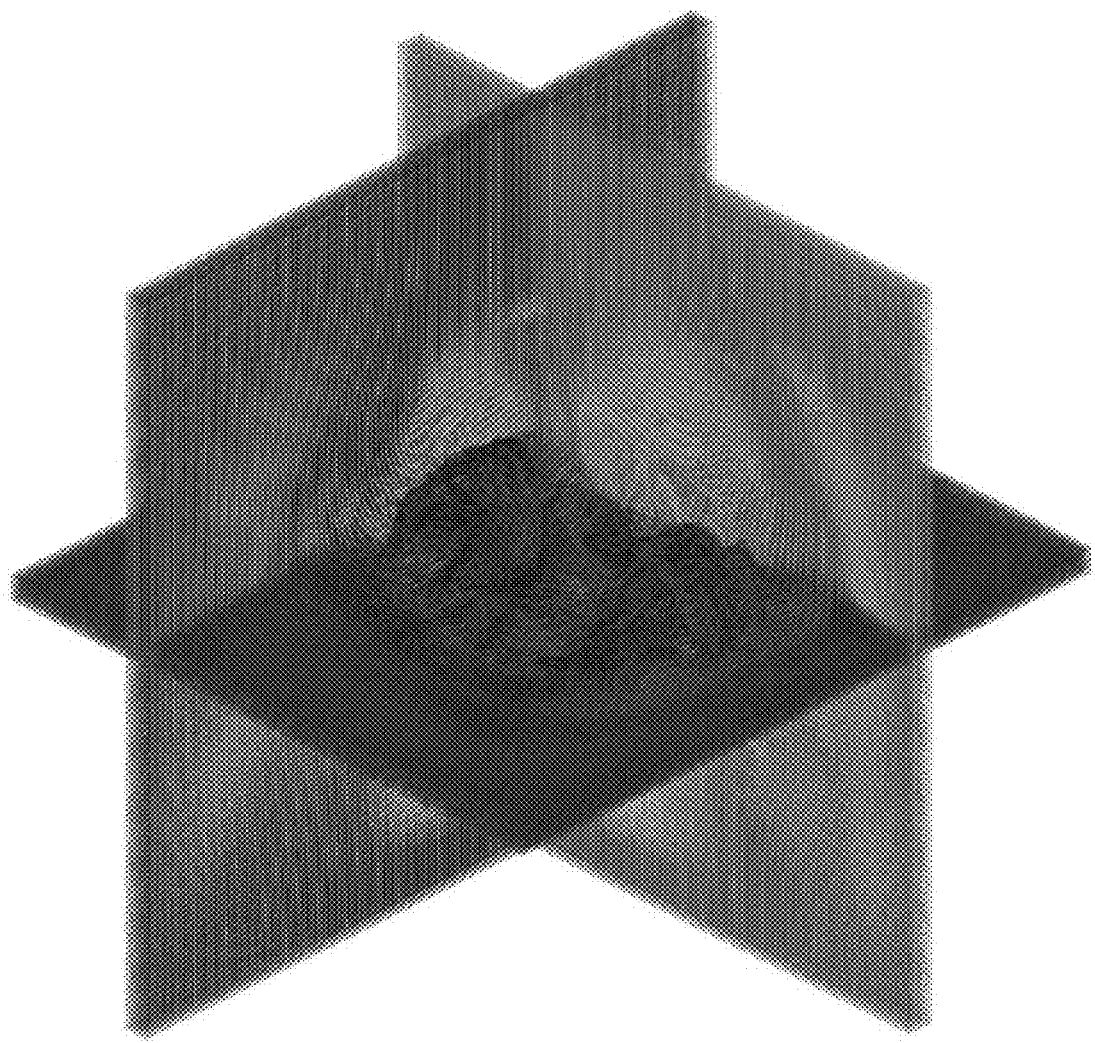
FIG. 5D shows the final mapping grid generated using 30 shells.

FIGS. 5A-5C provide a side-by-side comparison of 3D views of rs-FMRI (FIG. 5A), T1 (FIG. 5B) and rs-FMRI mapped to T1 (FIG. 5C) volumes. The processing was carried through 30 energy embedded shells and required about five minutes on 12 cores Intel Core™ i7-4930K CPU 3.40 GHz from start to the finish. A subset of the final grid is shown in FIG. 5D. Efforts are currently underway to include flexible mapping grids directly to our rs-FMRI mode detection approach.

Figure 6A:
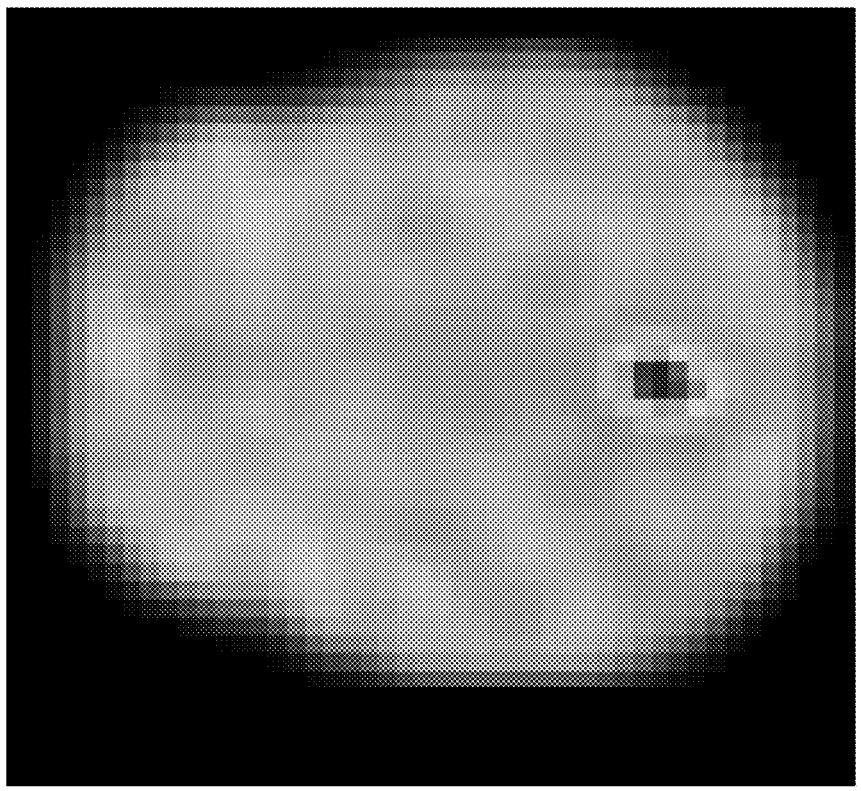
FIGS. 6A-6F provide comparisons of low resolution (64×64×30) rs-FMRI volume registered to T1 high resolution (290×262×262) anatomical volume (FIGS. 6A-6C) to symplectomorphic maps (FIGS. 6D-6F) generated according to the inventive method.
Figure 6D:
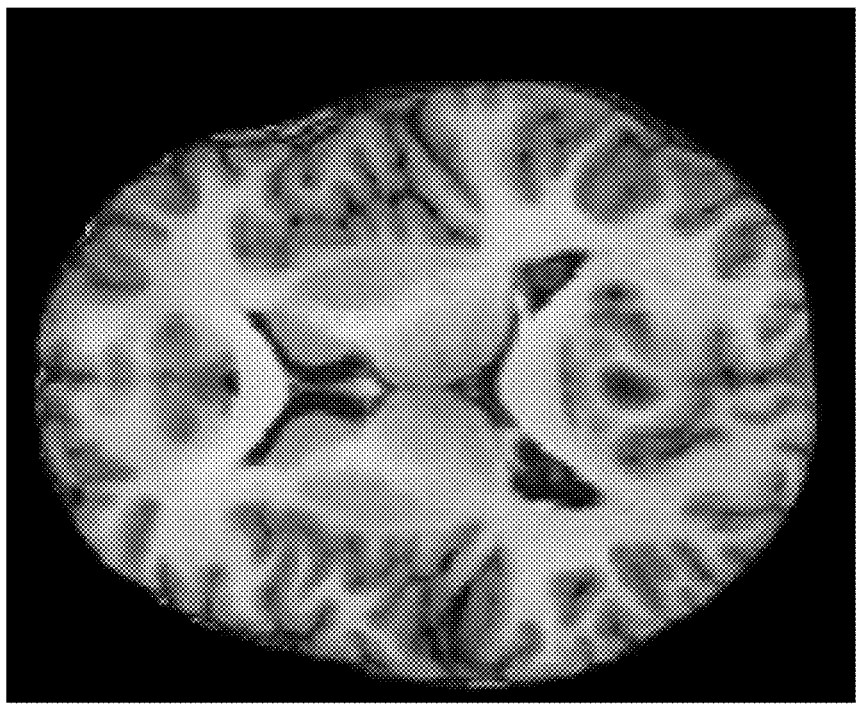
Figure 6B:
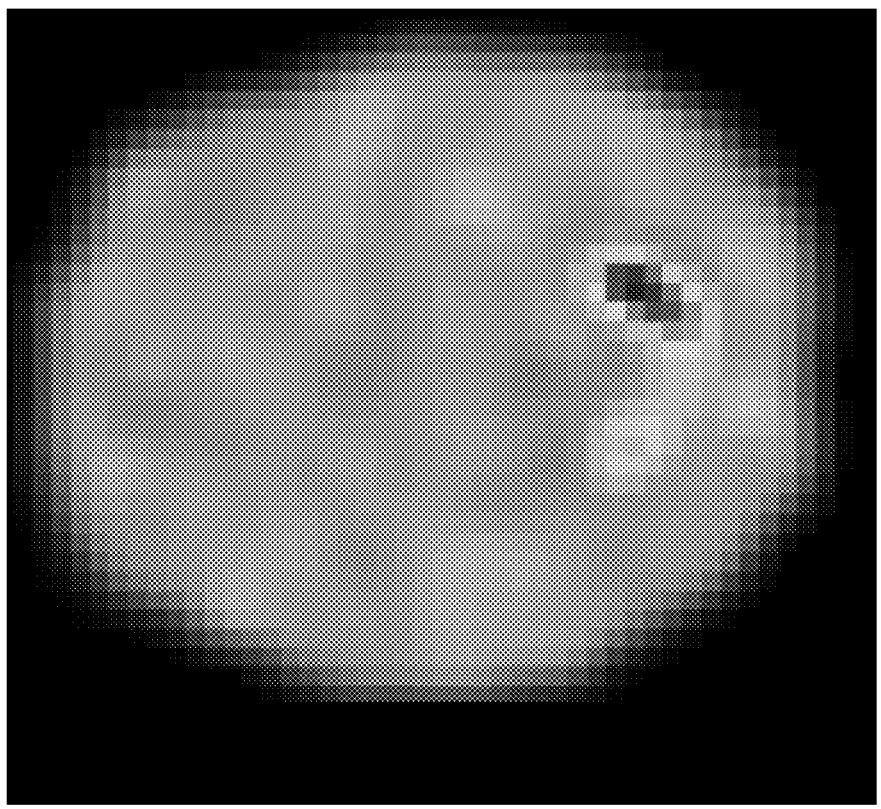
Figure 6E:
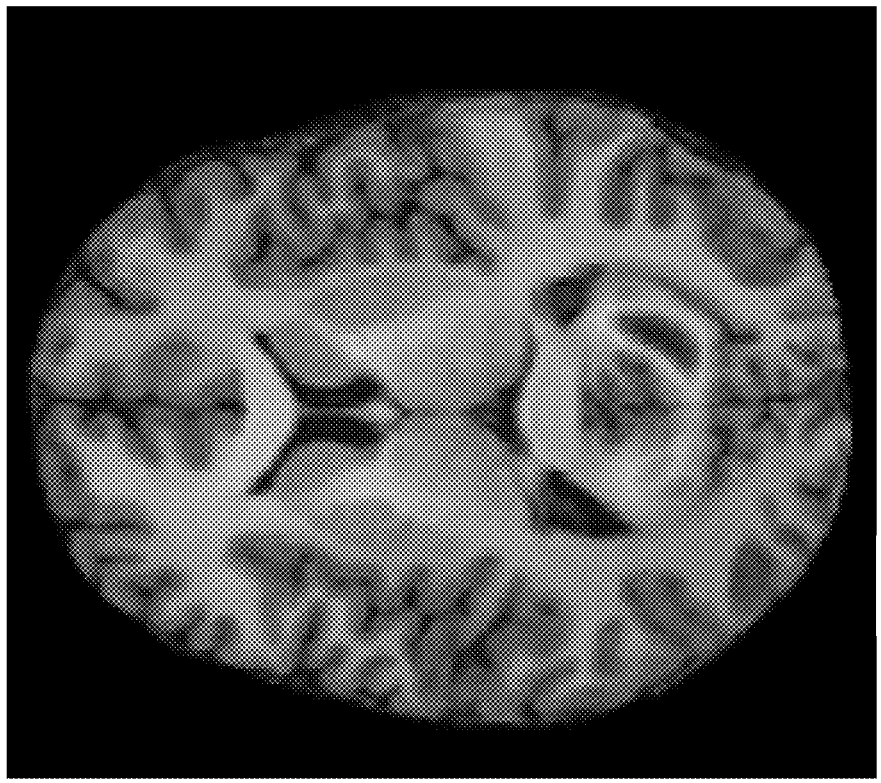
Figure 6C:
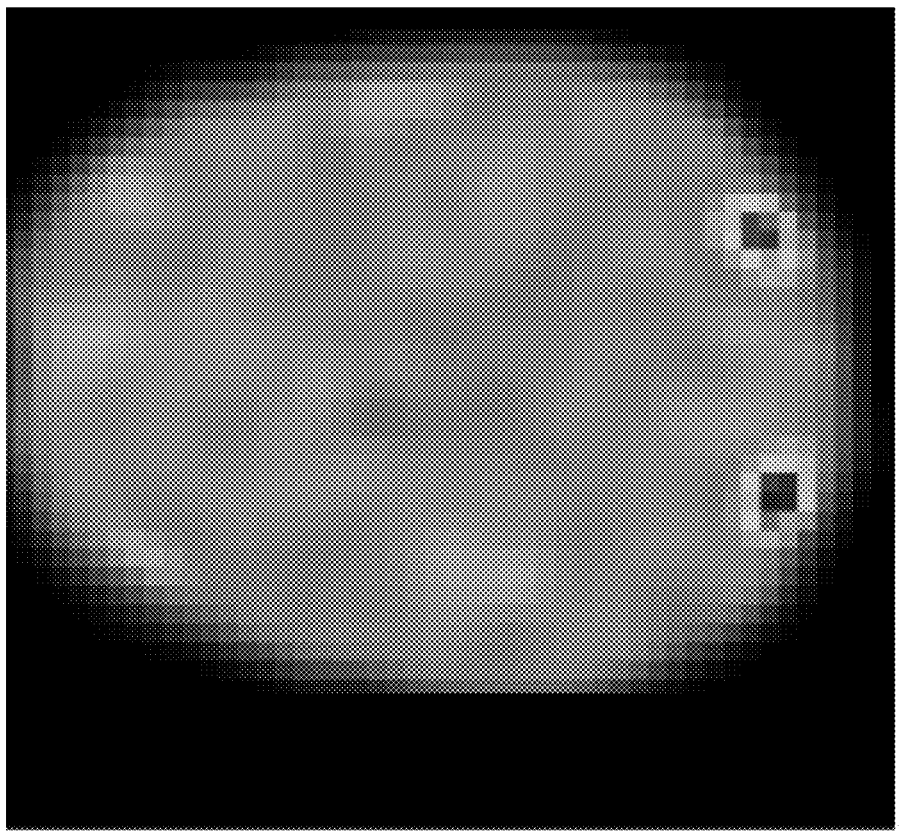
Figure 6F:
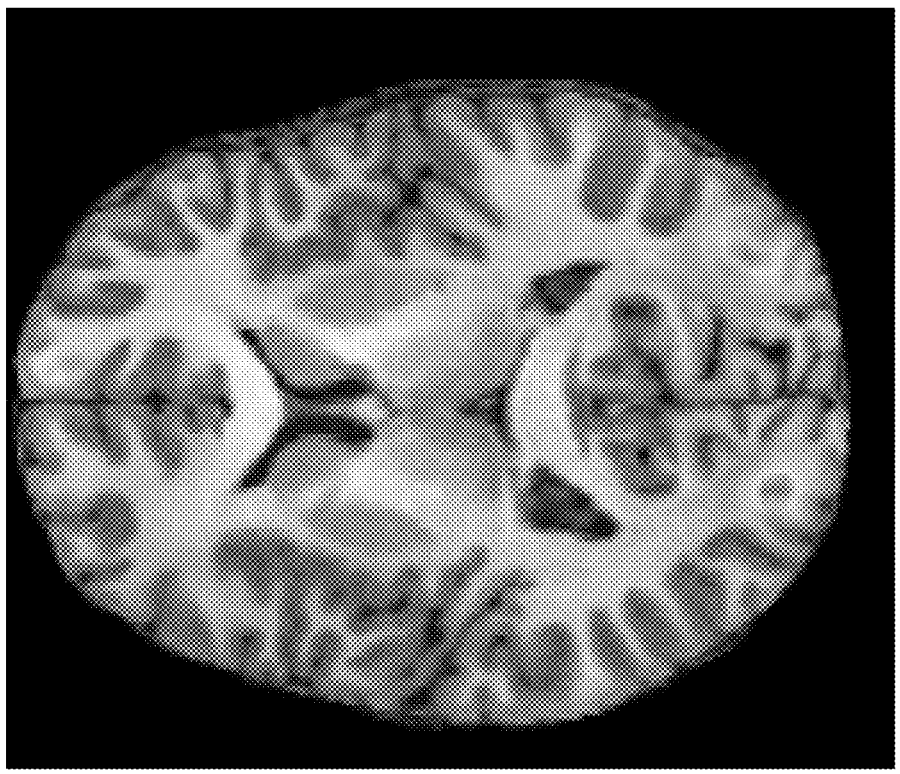

FIGS. 6A-6F provides comparisons of original and registered images for several of the resting state functional modes obtained using our entropy field decomposition (EFD) technique. FIGS. 6A and 6D show the default mode, FIGS. 6B and 6E, the visual lateral mode, and FIGS. 6C and 6F the visual occipital mode for some of the subjects from FIGS. 2A-2H. The symplectomorphically-mapped images overlayed over correspondent HRA slices in FIGS. 6D, 6E and 6F provide accurate localization of functional modes in the appropriate regions of HRA volumes.

The SymReg-ESP method described herein is a new and flexible multidimensional image registration approach based on the Hamiltonian formalism. The method generates a set of Hamilton's equations capable of producing a symplectomorphic transformation for mapping between Cartesian to curvilinear grids that minimizes some predefined image difference metric. The final diffeomorphic mapping is constructed as a multiplicative sequence of symplectomorphic transforms with gradually diminishing levels of total energy, thus providing a sequence of energy embedded symplectomorphic shells. For demonstration purposes, we used both a simple local squared difference, as well as a more complicated non-local image squared difference, as a Hamilton function. In general, Hamiltonian formalism allows easy adaptation of custom and possibly more complex forms of image difference metrics.

An application of the powerful and versatile ESP approach to the phase space domain resulted in a non-local form of Hamilton's equations. The non-local form represents an efficient and relatively straightforward way to introduce regularization that is able to take into account some image specific details or even additional knowledge based parameterizations.

The resolution differences between images as well as rigid shape alignment is addressed using the preconditioning step based on the SWD technique. This efficient volumetric decomposition computes a set of fast spherical harmonics and spherical Bessel transforms and is able to produce accurate interpolation, filtering and fitting of rigid shapes.

Overall, the symplectomorphic registration approach seems to be both accurate and fast and is capable of processing of a variety of volumetric images of different modalities and resolutions. In the examples described herein, we were able to handle all three different MRI modalities routinely used for human neuroimaging applications, including mapping between high resolution anatomical volumes, medium resolution diffusion weighted volumes and anatomicals, and low resolution functional MRI images and anatomicals. The typical processing time for high quality mapping ranges from less than a minute to several minutes on a modern multi core CPU for a typical high resolution anatomical MRI volumes. The speed, accuracy, and flexibility of this new method is expected to play an important role in the quantitative assessment of neuroimaging data in a wide range of both basic research and clinical applications.

REFERENCES

Ashburner, J., "A fast diffeomorphic image registration algorithm", *Neuroimage*, 2007, 38: 95-113.
Christensen, G. E., et al., "3D brain mapping using a deformable neuroanatomy", *Phys Med Biol* 1994. 39: 609-618.
Frank, L. R., Galinsky, V. L., "Information pathways in a disordered lattice" *Phys. Rev. E*, 2014, 89:032142.
Frank, L. R., Galinsky, V. L., "Detecting spatio-temporal modes in multivariate data by entropy field decomposition", *Journal of Physics A: Mathematical and Theoretical*, September 2016, Vol 49(39): 395001.
Frank, L. R., Galinsky, V. L., "Dynamic multi-scale modes of resting state brain activity detected by entropy field decomposition", *Neural Comput.*, 2016 September, 28(9):1769-1811.
Galinsky, V. L., Frank, L. R., "Automated Segmentation and Shape Characterization of Volumetric Data", *NeuroImage*, 2014, 92: 156-168.
Galinsky, V. L., Frank, L. R., "Simultaneous Multi-Scale Diffusion Estimation and Tractography Guided by Entropy Spectrum Pathways", *IEEE Trans Med Imaging*, 2015 May; 34(5):1177-93. doi: 10.1109/TMI.2014.2380812. Epub 2014 Dec. 18.
Narayanan, R., et al., "Diffeomorphic nonlinear transformations: a local parametric approach for image registration", *Inf Process Med Imaging*, 2005, 19: 174-185.

Setsompop, K., et al., "Blipped-controlled aliasing in parallel imaging for simultaneous multislice echo planar imaging with reduced g-factor penalty", *Magn. Reson. Med.* 2011, 67: 1210-1224.

Wong, C. W., et al., "The amplitude of the resting-state fMRI global signal is related to EEG vigilance measures", *Neuroimage*, 2013, 83: 983-990.

The invention claimed is:

1. A computer-implemented method for registration of a multi-dimensional image, comprising: acquiring, via an imaging system, a multi-dimensional first image defined on a fixed Cartesian grid having a plurality of locations; defining a multi-dimensional reference image on the fixed Cartesian grid; using a computer processor: receiving inputs comprising the reference image and the first image; mapping a location of the plurality of locations within the reference image and the first image to phase space using a Hamiltonian function to define a symplectomorphic map, wherein the Hamiltonian function is of the form:

$$\mathcal{H}(q, p) = \frac{1}{2V} \int [p^2 + (I_0(x) - I_1(q))^2] dx,$$

Where x is the fixed Cartesian grid, Io and I, are the reference and first images, respectively, V is a measure of the reference image $I_0$ domain (V≡∫dx), and (q(x, t), p(x, t)) is a set of canonical coordinates that define a time dependent mapping from Cartesian grid x to a new curvilinear grid y=q(x, t);

wherein the map is embedded in an energy shell; repeating the mapping for additional locations of the plurality of locations until a sequence of energy shells is generated; generating a curvilinear mapping grid corresponding to the sequence of energy shells; applying the curvilinear mapping grid to the first image to generate registered image data; and generating an output to a display device in communication with the computer processor comprising a registered image.

2. The method of claim 1, further comprising, prior to mapping a location, preconditioning the plurality of locations in one or both of the first image and the reference image to account for nearest neighbor coupling between adjacent grid locations by determining entropy spectrum pathways.

3. The method of claim 1, further comprising; prior to mapping a location, preconditioning the plurality of locations to equalize dimensionality of the reference image and the first image using spherical wave decomposition.

4. The method of claim 1, wherein the reference image is a high resolution image and the first image is a lower resolution image.

5. The method of claim 1, wherein the reference image and the first image are magnetic resonance imaging (MRI) images, and wherein the reference image is a high resolution anatomical (HRA) volume and the first image is a diffusion weighted image (DWI).

6. The method of claim 1, wherein the reference image and the first image are magnetic resonance imaging (MRI) images, and wherein the reference image is a high resolution anatomical (HRA) volume and the first image is functional magnetic resonance image (FMRI).

7. A system for registering a multi-dimensional image, the system comprising: a memory storing computer-executable instructions; a processor in communication with the memory and configured to execute the computer-executable instructions to perform: acquiring from an imaging system a multi-dimensional first image defined on a fixed Cartesian grid having a plurality of locations; defining a multi-dimensional reference image on the fixed Cartesian grid; mapping a location of the plurality of locations within the reference image and the first image to phase space using a Hamiltonian function to define a symplectomorphic map, wherein the Hamiltonian function is of the form:

$$\mathcal{H}(q, p) = \frac{1}{2V} \int [p^2 + (I_0(x) - I_1(q))^2] dx,$$

where x is the fixed Cartesian grid, Io and I, are the reference and first images, respectively, V is a measure of the reference image $I_0$ domain (V≡∫dx), and (q(x, t), p(x, t)) is a set of canonical coordinates that define a time dependent mapping from Cartesian grid x to a new curvilinear grid y=q(x, t);

wherein the map is embedded in an energy shell; repeating the mapping for additional locations of the plurality of locations until a sequence of energy shells is generated; generating a curvilinear mapping grid corresponding to the sequence of 30 energy shells; applying the curvilinear mapping grid to the first image to generate registered image data; and a display device in communication with the processor configured for receiving and displaying a registered images corresponding to the registered image data.

8. The system of claim 7, further comprising the processor executing computer-executable instruction to perform, prior to mapping a location, preconditioning the plurality of locations in one or both of the first image and the reference image to account for nearest neighbor coupling between adjacent grid locations by determining entropy spectrum pathways.

9. The system of claim 7, further comprising the processor executing computer-executable instruction to perform, prior to mapping a location, preconditioning the plurality of locations to equalize dimensionality of the reference image and the first image using spherical wave decomposition.

10. The system of claim 7, wherein the reference image is a high resolution image and the first image is a lower resolution image.

11. The system of claim 7, wherein the reference image and the first image are magnetic resonance imaging (MRI) images, and wherein the reference image is a high resolution anatomical (HRA) volume and the first image is a diffusion weighted image (DWI).

12. The system of claim 7, wherein the reference image and the first image are magnetic resonance imaging (MRI) images, and wherein the reference image is a high resolution anatomical (HRA) volume and the first image is functional magnetic resonance image (FMRI).

13. A computer-implemented method for registration of a multi-dimensional image, comprising:
acquiring, via an imaging system, a multi-dimensional first image defined on a fixed Cartesian grid having a plurality of locations;
defining a multi-dimensional reference image on the fixed Cartesian grid;
using a computer processor:
receiving inputs comprising the reference image and the first image;

preconditioning the plurality of locations in one or both of the first image and the reference image to account for nearest neighbor coupling between adjacent grid locations by determining entropy spectrum pathways;

preconditioning the plurality of locations to equalize dimensionality of the reference image and the first image using spherical wave decomposition;

mapping a location of the plurality of locations within the reference image and the first image to phase space using a Hamiltonian function having the form:

$$\mathcal{H}(q, p) = \frac{1}{2V} \int [p^2 + (I_0(x) - I_1(q)))^2] dx,$$

where x is the fixed Cartesian grid, $I_0$ and $I_1$ are the reference and first images, respectively, V is a measure of the reference image $I_0$ domain ($V \equiv \int dx$), and ($q(x,t)$, $p(x,t)$) is a set of canonical coordinates that define a time dependent mapping from Cartesian grid x to a new curvilinear grid $y \equiv q(x,t)$ to define a symplectomorphic map, wherein the map is embedded in an energy shell;

repeating the mapping for additional locations of the plurality of locations until a sequence of energy shells is generated;

generating a curvilinear mapping grid corresponding to the sequence of energy shells;

applying the curvilinear mapping grid to the first image to generate registered image data; and generating an output to a display device in communication with the computer processor comprising a registered image.

14. The method of claim 13, wherein the reference image is a high resolution image and the first image is a lower resolution image.

15. The method of claim 13, wherein the reference image and the first image are magnetic resonance imaging (MRI) images, and wherein the reference image is a high resolution anatomical (HRA) volume and the first image is a diffusion weighted image (DWI).

16. The method of claim 13, wherein the reference image and the first image are magnetic resonance imaging (MRI) images, and wherein the reference image is a high resolution anatomical (HRA) volume and the first image is functional magnetic resonance image (FMRI).

* * * * *